United States Patent
Kashiwagi et al.

(10) Patent No.: US 10,014,684 B2
(45) Date of Patent: Jul. 3, 2018

(54) POWER DISTRIBUTION MANAGEMENT APPARATUS, DISPLAY CONTROL METHOD, AND RECORDING MEDIUM

(71) Applicant: FUJITSU LIMITED, Kawasaki-shi, Kanagawa (JP)

(72) Inventors: Tetsuya Kashiwagi, Fukuoka (JP); Yuichi Matsufuji, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 440 days.

(21) Appl. No.: 14/673,952

(22) Filed: Mar. 31, 2015

(65) Prior Publication Data

US 2015/0207320 A1    Jul. 23, 2015

Related U.S. Application Data

(63) Continuation of application No. PCT/JP2012/075439, filed on Oct. 1, 2012.

(51) Int. Cl.
*H02J 3/00* (2006.01)
*G05B 15/02* (2006.01)
*H02J 13/00* (2006.01)

(52) U.S. Cl.
CPC ............... *H02J 3/00* (2013.01); *G05B 15/02* (2013.01); *H02J 13/0006* (2013.01);
(Continued)

(58) Field of Classification Search
None
See application file for complete search history.

(56) References Cited

U.S. PATENT DOCUMENTS

2006/0238364 A1  10/2006  Keefe et al.
2009/0030556 A1* 1/2009  Castelli ............... G06Q 10/063
                                                    700/286
(Continued)

FOREIGN PATENT DOCUMENTS

JP  62-077835  4/1987
JP  08-145702  6/1996
(Continued)

OTHER PUBLICATIONS

Extended European Search Report dated Sep. 25, 2015 for corresponding European Patent Application No. 12885951.9, 7 pages.
(Continued)

*Primary Examiner* — Ryan Jarrett
(74) *Attorney, Agent, or Firm* — Fujitsu Patent Center

(57) ABSTRACT

A power distribution management apparatus (10) stores electrical connection information in which a combination of a plurality of junctions at which a plurality of facilities of a power distribution system are electrically connected to each other and a facility determined based on the combination are associated, and searches a facility corresponding to the combination while investigating an uninvestigated junction among the plurality of junctions contained in the combination starting from a predetermined junction with reference to the electrical connection information, and acquires a display scale for displaying the power distribution system, and displays a facility having a junction near a substation from a predetermined facility among the facilities obtained as a result of the searching when the scale is equal to or less than a predetermined scale, and displays a facility obtained as a result of the searching when the scale is larger than the predetermined scale.

9 Claims, 28 Drawing Sheets

(52) U.S. Cl.
CPC ....... *H02J 13/0062* (2013.01); *H02J 13/0079* (2013.01); *Y02E 60/723* (2013.01); *Y02E 60/7838* (2013.01); *Y04S 10/16* (2013.01); *Y04S 40/124* (2013.01)

(56) References Cited

U.S. PATENT DOCUMENTS

2010/0138771 A1    6/2010    Kumar et al.
2012/0064923 A1    3/2012    Imes et al.

FOREIGN PATENT DOCUMENTS

| | | |
|---|---|---|
| JP | 10-070840 | 3/1998 |
| JP | 2004-032983 | 1/2004 |
| JP | 2007-295738 | 11/2007 |
| JP | 2009-284632 A | 12/2009 |

OTHER PUBLICATIONS

Japanese Office Action dated May 24, 2016 for corresponding Japanese Patent Application No. 2014-539505, with Partial English Translation, 7 pages.
International Search Report, mailed in connection with PCT/JP2012/075439 and dated Jun. 4, 2013.

\* cited by examiner

FIG.4

| POSITION ID | POSITION TYPE | LATITUDE | LONGITUDE |
|---|---|---|---|
| SS0001 | SS | 502723016 | 128084866 |
| PO0001 | POLE | 502723021 | 128084176 |
| PO0002 | POLE | 502723031 | 128083227 |
| PO0003 | POLE | 502724066 | 128083262 |
| PO0004 | POLE | 502725091 | 128083296 |
| PO0005 | POLE | 502726033 | 128083331 |
| PO0006 | POLE | 502726840 | 128083382 |
| PO0007 | POLE | 502727844 | 128083430 |
| PO0008 | POLE | 502728620 | 128083503 |
| LL0001 | LOADL | 502728677 | 128083736 |
| PO0009 | POLE | 502729231 | 128083641 |
| PO0010 | POLE | 502729304 | 128084383 |
| PO0011 | POLE | 502729179 | 128084814 |
| LL0002 | LOADL | 502729402 | 128085012 |
| PO0012 | POLE | 502728879 | 128085361 |
| PO0013 | POLE | 502728620 | 128085900 |
| LL0003 | LOADL | 502729298 | 128086064 |
| LL0004 | LOADL | 502729174 | 128086288 |
| LL0005 | LOADL | 502729133 | 128085547 |
| PO0014 | POLE | 502725019 | 128082520 |
| LL0006 | LOADL | 502724661 | 128082339 |
| PO0015 | POLE | 502725112 | 128081757 |
| PO0016 | POLE | 502725122 | 128081244 |
| LL0007 | LOADL | 502724765 | 128081321 |
| LL0008 | LOADL | 502724744 | 128081718 |

FIG.5

| FACILITY ID | POSITION ID | TYPE | ATTRIBUTE INFORMATION |
|---|---|---|---|
| PO0001 P1 | PO0001 | POLE | ... |
| PO0001 01 | PO0001 | SW | ... |
| PO0002 P1 | PO0002 | POLE | ... |
| PO0003 P1 | PO0003 | POLE | ... |
| PO0004 P1 | PO0004 | POLE | ... |
| PO0004 01 | PO0004 | SW | ... |
| PO0005 P1 | PO0005 | POLE | ... |
| PO0006 P1 | PO0006 | POLE | ... |
| PO0007 P1 | PO0007 | POLE | ... |
| PO0007 01 | PO0007 | BANK | RESISTANCE (36800 Ω), REACTANCE (31300 Ω), VOLTAGE RATIO 1 |
| PO0008 P1 | PO0008 | POLE | ... |
| LL0001 01 | LL0001 | LOADL | ... |
| PO0009 P1 | PO0009 | POLE | ... |
| PO0009 01 | PO0009 | SW | ... |
| PO0010 P1 | PO0010 | POLE | ... |
| PO0011 P1 | PO0011 | POLE | ... |
| LL0002 01 | LL0002 | LOADL | ... |
| PO0012 P1 | PO0012 | POLE | ... |
| PO0012 01 | PO0012 | BANK | RESISTANCE (36800 Ω), REACTANCE (31300 Ω), VOLTAGE RATIO 2 |
| PO0013 P1 | PO0013 | POLE | ... |
| LL0003 01 | LL0003 | LOADL | ... |
| LL0004 01 | LL0004 | LOADL | ... |
| LL0005 01 | LL0005 | LOADL | ... |
| PO0014 P1 | PO0014 | POLE | ... |
| LL0006 01 | LL0006 | LOADL | ... |
| PO0015 P1 | PO0015 | POLE | ... |
| PO0015 01 | PO0015 | BANK | RESISTANCE (36800 Ω), REACTANCE (31300 Ω), VOLTAGE RATIO 3 |
| PO0016 P1 | PO0016 | POLE | ... |
| LL0007 01 | LL0007 | LOADL | ... |
| LL0008 01 | LL0008 | LOADL | ... |

| FACILITY ID | POSITION ID$_1$ | POSITION ID$_2$ | TYPE | ATTRIBUTE INFORMATION |||
|---|---|---|---|---|---|---|
| | | | | SPAN SIZE | RESISTANCE (R) | REACTANCE (X) |
| SP0001 | SS0001 | PO0001 | 3H | 21 | 220 | 150 |
| SP0002 | PO0001 | PO0002 | 3H | 29 | 220 | 150 |
| SP0003 | PO0002 | PO0003 | 3H | 32 | 220 | 150 |
| SP0004 | PO0003 | PO0004 | 3H | 32 | 220 | 150 |
| SP0005 | PO0004 | PO0005 | 3H | 29 | 220 | 150 |
| SP0006 | PO0005 | PO0006 | 3H | 25 | 220 | 150 |
| SP0007 | PO0006 | PO0007 | 3H | 31 | 220 | 150 |
| SP0008 | PO0007 | PO0008 | 3H | 24 | 220 | 150 |
| SP0009 | PO0007 | PO0008 | 3L | 24 | 390 | 240 |
| SP0010 | PO0008 | LL0001 | | 7 | 510 | 820 |
| SP0011 | PO0008 | PO0009 | 3H | 19 | 220 | 150 |
| SP0012 | PO0009 | PO0010 | 3H | 23 | 220 | 150 |
| SP0013 | PO0010 | PO0011 | 3H | 14 | 220 | 150 |
| SP0014 | PO0012 | PO0011 | 3L | 19 | 390 | 240 |
| SP0015 | PO0011 | LL0002 | | 9 | 510 | 820 |
| SP0016 | PO0011 | PO0012 | 3H | 19 | 220 | 150 |
| SP0017 | PO0012 | PO0013 | 3L | 18 | 390 | 240 |
| SP0018 | PO0013 | LL0003 | | 22 | 510 | 820 |
| SP0019 | PO0013 | LL0004 | | 21 | 510 | 820 |
| SP0020 | PO0012 | LL0005 | | 10 | 510 | 820 |
| SP0021 | PO0004 | PO0014 | 3H | 24 | 220 | 150 |
| SP0022 | PO0015 | PO0014 | 3L | 24 | 390 | 240 |
| SP0023 | PO0014 | LL0006 | | 12 | 510 | 820 |
| SP0024 | PO0014 | PO0015 | 3H | 24 | 220 | 150 |
| SP0025 | PO0015 | PO0016 | 3L | 16 | 390 | 240 |
| SP0026 | PO0016 | LL0007 | | 11 | 510 | 820 |
| SP0027 | PO0015 | LL0008 | | 11 | 510 | 820 |

FIG.7

| NODE ID | POSITION ID |
|---|---|
| SS0001 N01 | SS0001 |
| PO0001 N01 | PO0001 |
| PO0001 N02 | PO0001 |
| PO0002 N01 | PO0002 |
| PO0003 N01 | PO0003 |
| PO0004 N01 | PO0004 |
| PO0004 N02 | PO0004 |
| PO0005 N01 | PO0005 |
| PO0006 N01 | PO0006 |
| PO0007 N01 | PO0007 |
| PO0007 N02 | PO0007 |
| PO0008 N01 | PO0008 |
| PO0008 N02 | PO0008 |
| LL0001 N01 | LL0001 |
| PO0009 N01 | PO0009 |
| PO0009 N02 | PO0009 |
| PO0010 N01 | PO0010 |
| PO0011 N01 | PO0011 |
| PO0011 N02 | PO0011 |
| LL0002 N01 | LL0002 |
| PO0012 N01 | PO0012 |
| PO0012 N02 | PO0012 |
| PO0013 N01 | PO0013 |
| LL0003 N01 | LL0003 |
| LL0004 N01 | LL0004 |
| LL0005 N01 | LL0005 |
| PO0014 N01 | PO0014 |
| PO0014 N02 | PO0014 |
| LL0006 N01 | LL0006 |
| PO0015 N01 | PO0015 |
| PO0015 N02 | PO0015 |
| PO0016 N01 | PO0016 |
| LL0007 N01 | LL0007 |
| LL0008 N01 | LL0008 |

| BRANCH ID | NODE ID$_1$ | NODE ID$_2$ | FACILITY ID | OPEN/CLOSE DIVISION |
|---|---|---|---|---|
| BR0001 | SS0001 N01 | PO0001 N01 | SP0001 | |
| BR0002 | PO0001 N01 | PO0001 N02 | PO0001 01 | 1 |
| BR0003 | PO0001 N02 | PO0002 N01 | SP0002 | |
| BR0004 | PO0002 N01 | PO0003 N01 | SP0003 | |
| BR0005 | PO0003 N01 | PO0004 N01 | SP0004 | |
| BR0006 | PO0004 N01 | PO0004 N02 | PO0004 01 | 1 |
| BR0007 | PO0004 N02 | PO0005 N01 | SP0005 | |
| BR0008 | PO0005 N01 | PO0006 N01 | SP0006 | |
| BR0009 | PO0006 N01 | PO0007 N01 | SP0007 | |
| BR0010 | PO0007 N01 | PO0007 N02 | PO0007 01 | |
| BR0011 | PO0007 N01 | PO0008 N01 | SP0008 | |
| BR0012 | PO0007 N02 | PO0008 N02 | SP0009 | |
| BR0013 | PO0008 N02 | LL0001 N01 | SP0010 | |
| BR0014 | LL0001 N01 | | LL0001 01 | |
| BR0018 | PO0008 N01 | PO0009 N01 | SP0011 | |
| BR0019 | PO0009 N01 | PO0009 N02 | PO0009 01 | 1 |
| BR0020 | PO0009 N02 | PO0010 N01 | SP0012 | |
| BR0021 | PO0010 N01 | PO0011 N01 | SP0013 | |
| BR0022 | PO0012 N02 | PO0011 N02 | SP0014 | |
| BR0023 | PO0011 N02 | LL0002 N01 | SP0015 | |
| BR0024 | LL0002 N01 | | LL0002 01 | |
| BR0028 | PO0011 N01 | PO0012 N01 | SP0016 | |
| BR0029 | PO0012 N01 | PO0012 N02 | PO0012 01 | |
| BR0030 | PO0012 N02 | PO0013 N01 | SP0017 | |
| BR0031 | PO0013 N01 | LL0003 N01 | SP0018 | |
| BR0032 | LL0003 N01 | | LL0003 01 | |
| BR0036 | PO0013 N01 | LL0004 N01 | SP0019 | |
| BR0037 | LL0004 N01 | | LL0004 01 | |
| BR0041 | PO0012 N02 | LL0005 N01 | SP0020 | |
| BR0042 | LL0005 N01 | | LL0005 01 | |
| BR0046 | PO0004 N01 | PO0014 N01 | SP0021 | |
| BR0047 | PO0015 N02 | PO0014 N02 | SP0022 | |
| BR0048 | PO0014 N02 | LL0006 N01 | SP0023 | |
| BR0049 | LL0006 N01 | | LL0006 01 | |
| BR0053 | PO0014 N01 | PO0015 N01 | SP0024 | |
| BR0054 | PO0015 N01 | PO0015 N02 | PO0015 01 | |
| BR0055 | PO0015 N02 | PO0016 N01 | SP0025 | |
| BR0056 | PO0016 N01 | LL0007 N01 | SP0026 | |
| BR0057 | LL0007 N01 | | LL0007 01 | |
| BR0061 | PO0015 N02 | LL0008 N01 | SP0027 | |
| BR0062 | LL0008 N01 | | LL0008 01 | |

FIG.9

| CONNECTION ID | POSITION ID | POWER CONSUMPTION (EFFECTIVE) | POWER CONSUMPTION (REACTIVE) |
|---|---|---|---|
| SS0001 N01 | SS0001 | | |
| PO0001 N01 | PO0001 | | |
| PO0001 N02 | PO0001 | | |
| PO0002 N01 | PO0002 | | |
| PO0003 N01 | PO0003 | | |
| PO0004 N01 | PO0004 | | |
| PO0004 N02 | PO0004 | | |
| PO0005 N01 | PO0005 | | |
| PO0006 N01 | PO0006 | | |
| PO0007 N01 | PO0007 | | |
| PO0007 N02 | PO0007 | | |
| PO0008 N01 | PO0008 | | |
| PO0008 N02 | PO0008 | | |
| LL0001 N01 | LL0001 | 200 | 20 |
| PO0009 N01 | PO0009 | | |
| PO0009 N02 | PO0009 | | |
| PO0010 N01 | PO0010 | | |
| PO0011 N01 | PO0011 | | |
| PO0011 N02 | PO0011 | | |
| LL0002 N01 | LL0002 | 220 | 22 |
| PO0012 N01 | PO0012 | | |
| PO0012 N02 | PO0012 | | |
| PO0013 N01 | PO0013 | | |
| LL0003 N01 | LL0003 | 180 | 18 |
| LL0004 N01 | LL0004 | 240 | 24 |
| LL0005 N01 | LL0005 | 210 | 21 |
| PO0014 N01 | PO0014 | | |
| PO0014 N02 | PO0014 | | |
| LL0006 N01 | LL0006 | 300 | 30 |
| PO0015 N01 | PO0015 | | |
| PO0015 N02 | PO0015 | | |
| PO0016 N01 | PO0016 | | |
| LL0007 N01 | LL0007 | 240 | 24 |
| LL0008 N01 | LL0008 | 230 | 23 |

FIG.10

| BRANCH ID | NODE ID$_1$ | NODE ID$_2$ | FACILITY ID | OPEN/CLOSE DIVISION | REACTANCE (X) | RESISTANCE (R) |
|---|---|---|---|---|---|---|
| BR0001 | SS0001 N01 | PO0001 N01 | SP0001 | | 3150 | 4620 |
| BR0002 | PO0001 N01 | PO0001 N02 | PO0001 01 | 1 | 0 | 0 |
| BR0003 | PO0001 N02 | PO0002 N01 | SP0002 | | 4350 | 6380 |
| BR0004 | PO0002 N01 | PO0003 N01 | SP0003 | | 4800 | 7040 |
| BR0005 | PO0003 N01 | PO0004 N01 | SP0004 | | 4800 | 7040 |
| BR0006 | PO0004 N01 | PO0004 N02 | PO0004 01 | 1 | 0 | 0 |
| BR0007 | PO0004 N02 | PO0005 N01 | SP0005 | | 4350 | 6380 |
| BR0008 | PO0005 N01 | PO0006 N01 | SP0006 | | 3750 | 5500 |
| BR0009 | PO0006 N01 | PO0007 N01 | SP0007 | | 4650 | 6820 |
| BR0010 | PO0007 N01 | PO0007 N02 | PO0007 01 | | 31300 | 36800 |
| BR0011 | PO0007 N01 | PO0008 N01 | SP0008 | | 3600 | 5280 |
| BR0012 | PO0007 N02 | PO0008 N02 | SP0009 | | 5760 | 9360 |
| BR0013 | PO0008 N02 | LL0001 N01 | SP0010 | | 5740 | 3570 |
| BR0014 | LL0001 N01 | | LL0001 01 | | 0 | 0 |
| BR0018 | PO0008 N01 | PO0009 N01 | SP0011 | | 2850 | 4180 |
| BR0019 | PO0009 N01 | PO0009 N02 | PO0009 01 | 1 | 0 | 0 |
| BR0020 | PO0009 N02 | PO0010 N01 | SP0012 | | 3450 | 5060 |
| BR0021 | PO0010 N01 | PO0011 N01 | SP0013 | | 2100 | 3080 |
| BR0022 | PO0012 N02 | PO0011 N02 | SP0014 | | 4560 | 7410 |
| BR0023 | PO0011 N02 | LL0002 N01 | SP0015 | | 7380 | 4590 |
| BR0024 | LL0002 N01 | | LL0002 01 | | 0 | 0 |
| BR0028 | PO0011 N01 | PO0012 N01 | SP0016 | | 2850 | 4180 |
| BR0029 | PO0012 N01 | PO0012 N02 | PO0012 01 | | 31300 | 36800 |
| BR0030 | PO0012 N02 | PO0013 N01 | SP0017 | | 4320 | 7020 |
| BR0031 | PO0013 N01 | LL0003 N01 | SP0018 | | 18040 | 11220 |
| BR0032 | LL0003 N01 | | LL0003 01 | | 0 | 0 |
| BR0036 | PO0013 N01 | LL0004 N01 | SP0019 | | 17220 | 10710 |
| BR0037 | LL0004 N01 | | LL0004 01 | | 0 | 0 |
| BR0041 | PO0012 N02 | LL0005 N01 | SP0020 | | 8200 | 5100 |
| BR0042 | LL0005 N01 | | LL0005 01 | | 0 | 0 |
| BR0046 | PO0004 N01 | PO0014 N01 | SP0021 | | 3600 | 5280 |
| BR0047 | PO0015 N02 | PO0014 N02 | SP0022 | | 5760 | 9360 |
| BR0048 | PO0014 N02 | LL0006 N01 | SP0023 | | 9840 | 6120 |
| BR0049 | LL0006 N01 | | LL0006 01 | | 0 | 0 |
| BR0053 | PO0014 N01 | PO0015 N01 | SP0024 | | 3600 | 5280 |
| BR0054 | PO0015 N01 | PO0015 N02 | PO0015 01 | | 31300 | 36800 |
| BR0055 | PO0015 N02 | PO0016 N01 | SP0025 | | 3840 | 6240 |
| BR0056 | PO0016 N01 | LL0007 N01 | SP0026 | | 9020 | 5610 |
| BR0057 | LL0007 N01 | | LL0007 01 | | 0 | 0 |
| BR0061 | PO0015 N02 | LL0008 N01 | SP0027 | | 9020 | 5610 |
| BR0062 | LL0008 N01 | | LL0008 01 | | 0 | 0 |

FIG.29

| NODE ID | ENERGIZING STATE |
|---|---|
| N1 | 1 |
| N2 | 1 |
| N3 | 1 |
| N4 | 1 |
| N5 | 1 |
| N6 | 1 |
| N7 | 1 |
| N8 | 1 |
| N9 | 1 |
| N10 | 1 |

| BRANCH ID | NODE ID$_1$ | NODE ID$_2$ | FACILITY ID | ... |
|---|---|---|---|---|
| B1 | N1 | N2 | SP1 | ... |
| B2 | N2 | N3 | SW1 | ... |
| B3 | N3 | N4 | SP2 | ... |
| B4 | N4 | N5 | TR1 | ... |
| B5 | N5 | N6 | SP3 | ... |
| B6 | N6 | N7 | SP4 | ... |
| B7 | N7 | - | LL1 | ... |
| B8 | N5 | N8 | SP5 | ... |
| B9 | N8 | N9 | SP6 | ... |
| B10 | N9 | - | LL2 | ... |
| B11 | N8 | N10 | SP7 | ... |
| B12 | N10 | - | LL3 | ... |
| B13 | N10 | - | LL4 | ... |

17b

POWER DISTRIBUTION MANAGEMENT APPARATUS, DISPLAY CONTROL METHOD, AND RECORDING MEDIUM

CROSS-REFERENCE TO RELATED APPLICATION

This application is a continuation application of International Application PCT/JP2012/075439 filed on Oct. 1, 2012 and designating the U.S., the entire contents of which are incorporated herein by reference.

FIELD

The embodiments discussed herein are directed to a power distribution management apparatus, a display control method, and a display control program.

BACKGROUND

In a power distribution system, a high-voltage wire used to supply high-voltage power and a low-voltage wire used to supply low-voltage power are included. Standard voltages and allowable ranges to allow a deviation from the standard voltages are defined for the high-voltage wire and the low-voltage wire. For this reason, a voltage drop is calculated by dividing the power distribution system from the substation to the load facility into a high-voltage system containing facilities such as the high-voltage wire and a switch and a low-voltage system containing facilities such as a low-voltage wire and a lead-in wire. Then, the voltage of the power distributed from the substation is set such that a voltage before and after the voltage drop remains in the allowable ranges of the high-voltage system and the low-voltage system, or the voltage of the power flowing through the power distribution system is adjusted by switching the switch disposed in the high-voltage system.

Patent Literature 1: Japanese Laid-open Patent Publication No. 10-70840

Patent Literature 2: Japanese Laid-open Patent Publication No. 2004-32983

By the way, as a distributed power source such as photovoltaic power generation comes into wide use, the distributed power source is provided in the customer in some cases. In this case, it may occur that a reverse power flows from the distributed power source disposed in the customer to the power distribution system of the electric power provider. Therefore, in a case where the power flows bidirectionally between the power substation and the load facility, for example, it may be considered that the power at each facility contained in the low-voltage system is significantly changed by the reverse power flow.

However, in the related art described above, there is a problem in that electrical connection of the power distribution system can be ascertained only in a rough unit of the high-voltage system and the low-voltage system. Therefore, in the related art described above, there is a concern that the abnormal situation is overlooked in a case where the power of the voltage exceeding the allowable range flows in a unit smaller than the high-voltage system and the low-voltage system.

SUMMARY

According to an aspect of the embodiment of the invention, a power distribution management apparatus includes: an electrical connection storage unit configured to store electrical connection information in which a combination of a plurality of junctions at which a plurality of facilities of a power distribution system are electrically connected to each other and a facility determined based on the combination are associated; a search unit configured to search a facility corresponding to the combination while investigating an uninvestigated junction among the plurality of junctions contained in the combination starting from a predetermined junction with reference to the electrical connection information; an acquisition unit configured to acquire a display scale for displaying the power distribution system; and a display controller configured to display a facility having a junction near a substation from a predetermined facility among the facilities obtained as a result of the searching when the scale is equal to or less than a predetermined scale, and display a facility obtained as a result of the searching when the scale is larger than the predetermined scale.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a "location" table.

FIG. 5 is a diagram illustrating an example of a "unit" table.

FIG. 6 is a diagram illustrating an example of a "span" table.

FIG. 7 is a diagram illustrating an example of a node table.

FIG. 8 is a diagram illustrating an example of a "branch" table.

FIG. 9 is a diagram illustrating an example of a current node table.

FIG. 10 is a diagram illustrating an example of a current "branch" table.

FIG. 29 is a diagram illustrating an example of a current node table.

FIG. 30 is a diagram illustrating an example of a current "branch" table.

DESCRIPTION OF EMBODIMENTS

A power distribution management apparatus, a display control method, and a display control program according to the present application will be described with reference to the accompanying drawings. Further, embodiments herein do not limit the disclosed technology. Then, the respective embodiments can be implemented by appropriately combining each other in a scope where the processing contents are compossible.

First Embodiment

Configuration of Power Distribution Management Apparatus

Figure 1:
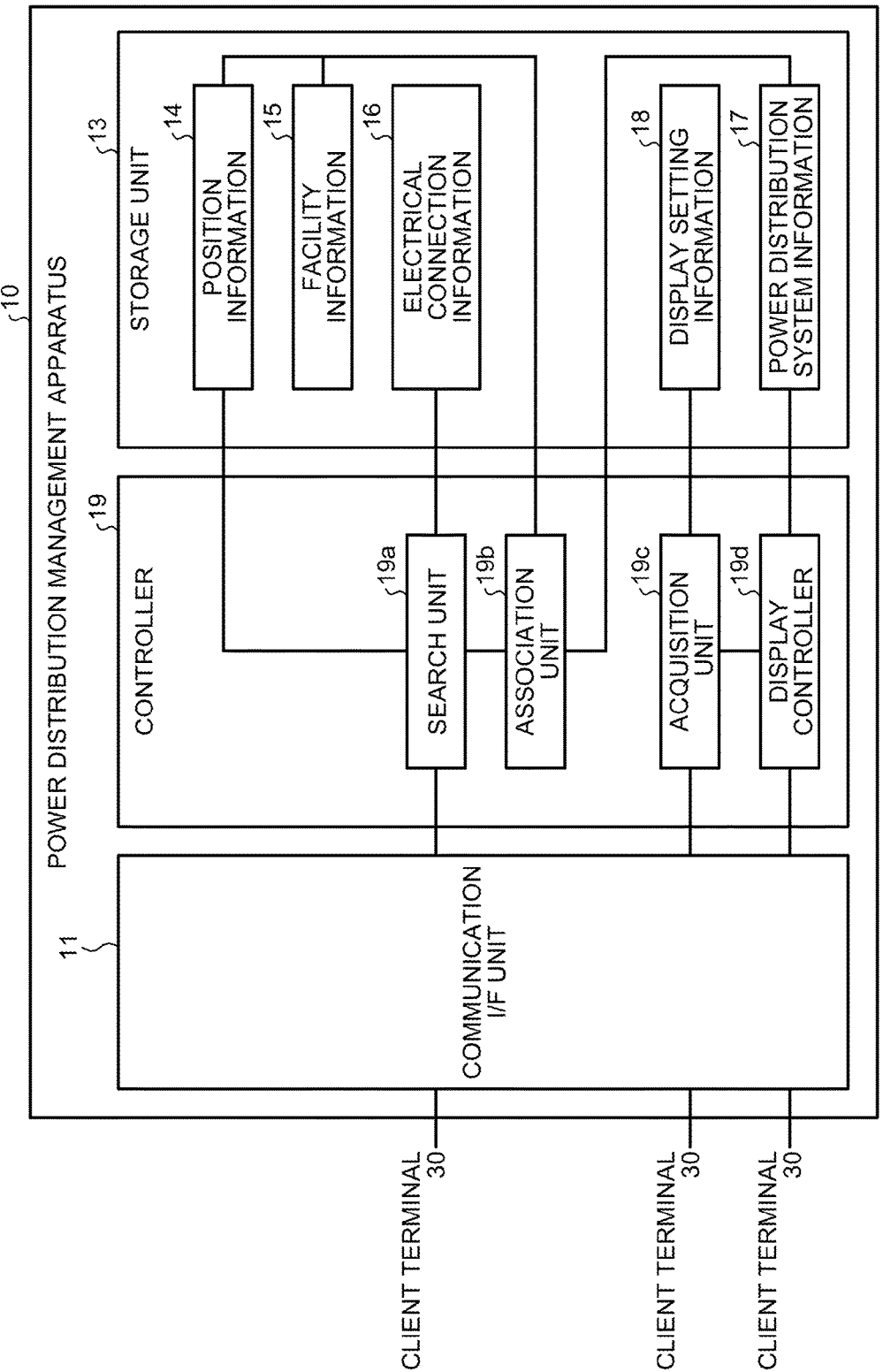
FIG. 1 is a block diagram illustrating a functional configuration of a power distribution management apparatus according to a first embodiment.

FIG. 1 is a block diagram illustrating a functional configuration of a power distribution management apparatus according to a first embodiment. A power distribution management apparatus 10 illustrated in FIG. 1 performs a display control process in which power distribution system information of facilities electrically connected to each other by a power distribution system between a substation of an electric power provider and a load facility of a customer is generated and displayed in a client terminal 30.

As an aspect of such power distribution management apparatus 10, a Web server may be mounted to perform the display control process, or an outsourcing cloud may be mounted to provide a service of the display control process. As another aspect, there may be provided a desired computer in which a display control program provided as package software or online software is preinstalled or installed.

As illustrated in FIG. 1, the power distribution management apparatus 10 is connected for communication with another apparatus such as the client terminal 30 through a predetermined network. As such a network, any type of communication network such as the Internet, a LAN (Local Area Network), or a VPN (Virtual Private Network) may be employed regardless of whether the network is wired or wireless. Further, the power distribution management apparatus 10 can contain any number of the client terminals 30.

The client terminal 30 is a terminal apparatus where receives the display control service. As an example of the client terminal 30, besides a fixed terminal including a personal computer (PC), a movable terminal such as a portable telephone, a PHS (Personal Handyphone System), or a PDA (Personal Digital Assistant) can also be employed. Further, the client terminal 30 is used by a member of the electric power provider, for example, a person in charge for the power distribution section or a manager.

As illustrated in FIG. 1, the power distribution management apparatus 10 includes a communication I/F (interface) unit 11, a storage unit 13, and a controller 19. Further, besides the functional units illustrated in FIG. 1, the power distribution management apparatus 10 may include various types of functional units (for example, functional units such as various types of input/output devices or an image pickup device) included in a well-known computer.

The communication I/F unit 11 is an interface for performing communication control with respect to other apparatuses (for example, the client terminal 30). As an aspect of such communication I/F unit 11, a network interface card such as a LAN card can be employed. For example, the communication I/F unit 11 receives a browse request for a power distribution system screen from the client terminal 30, or transmits display data of the power distribution system screen from the power distribution management apparatus 10 to the client terminal 30.

The storage unit 13 is a storage device which stores various types of programs such as an OS (Operating System) performed by the controller 19 and the display control program. As an aspect of the storage unit 13, a semiconductor memory element such as flash memory and a storage device such as a hard disk and an optical disk are exemplified. Further, the storage unit 13 is not limited to the above-mentioned storage devices, and may be RAM (Random Access Memory) or ROM (Read Only Memory).

The storage unit 13 stores position information 14, facility information 15, electrical connection information 16, power distribution system information 17, and display setting information 18 as an example of data used in the program executed by the controller 19. Further, besides the information described above, other electronic data (for example, electronic data of a map containing a part of or all the service area managed by the electric power provider) may also be stored.

Herein, in the power distribution management apparatus 10 according to the embodiment, the power distribution system is managed into three divisions as follows: a position management in which a location of the facility is managed, a facility management in which the respective facilities are managed, and an electrical connection management in which the facilities electrically connected to each other are managed.

Among them, in the position management, a position "location" at which a predetermined facility (for example, a power substation, an power pole, a transformer, and the like) is provided among the facilities forming the power distribution system is used as an entity. In addition, in the facility management, a facility "unit" linked at a position of one of the facilities forming the power distribution system and a facility "span" linked at two positions are used as an entity. In addition, in the electrical connection management, a junction "node" at which the facilities are electrically connected to each other and a facility "branch" determined from a plurality of junctions are used as an entity.

Figure 2:
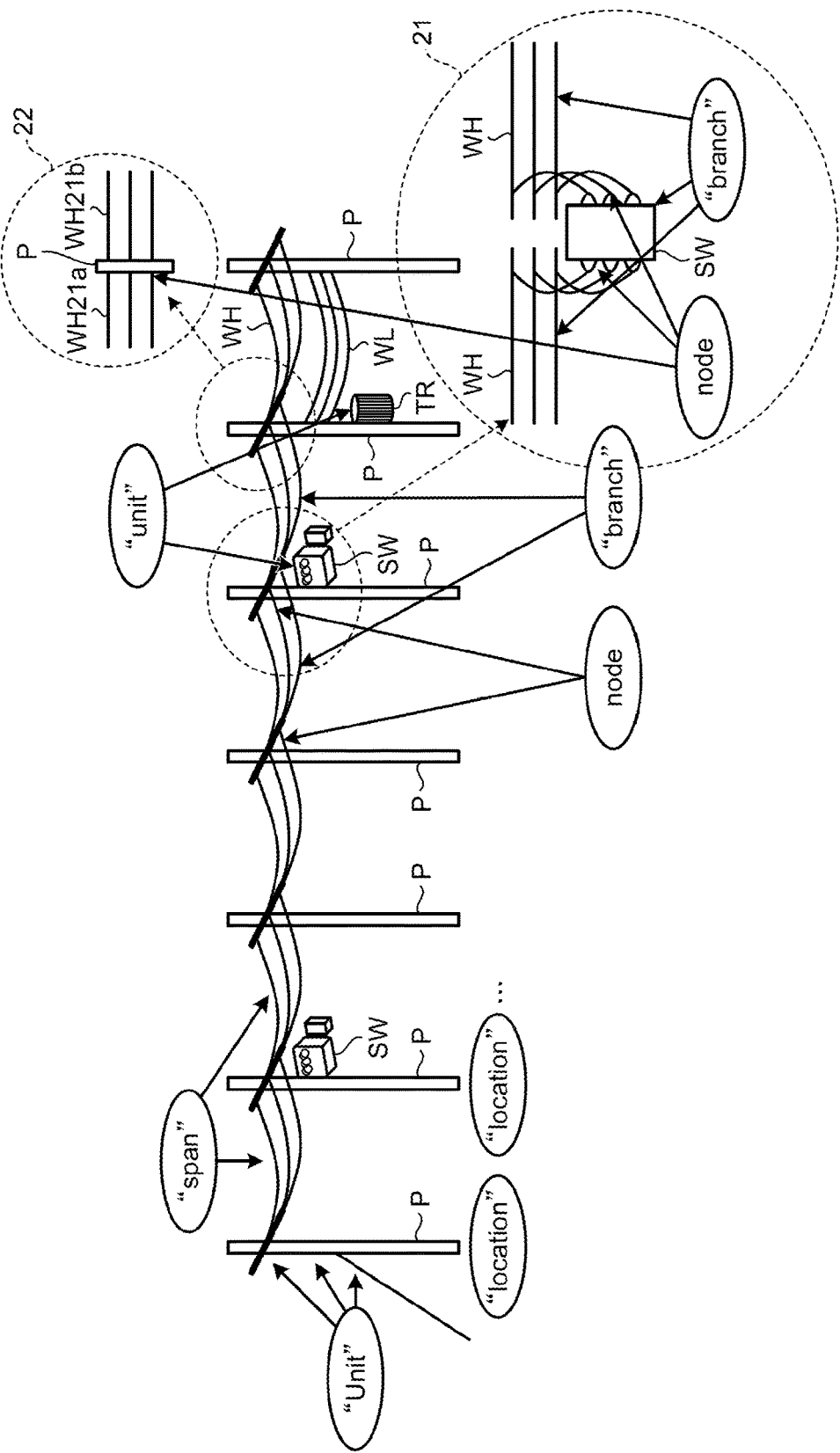
FIG. 2 is a diagram illustrating an aspect of entities.

FIG. 2 is a diagram illustrating an aspect of the entity. As illustrated in FIG. 2, as an example of the "location", for example, there is a position where a non-installation facility (such as an power pole P and a pole transformer TR) of which the provision type is not installation is provided.

Besides, a position of a power distribution substation (SS) (not illustrated) or a position of the transformer is also included in a category of the "location".

As an example of a "unit", there are the power pole P, a switch SW, the pole transformer TR, and the like. Besides, the power distribution substation, an SVR (Step Voltage Regulator), and various types of meters (not illustrated), for example, a smart meter, are also included in a category of the "unit". Further, the description herein has been made about a facility which is provided on the ground, but a facility provided under the ground (for example, a manhole or a handhole) is also included in a category of the "unit".

As an example of the "span", there is a wire (so-called "high-voltage wire") WH laid on the high-voltage system to which high-voltage power is supplied between the power distribution substation and the pole transformer TR. As another example of the "span", there is a wire (so-called "lead-in wire") laid on a section from the lead-in wire to the load facility, in addition to a wire (so-called "low-voltage wire") WL laid on a section from the pole transformer TR to the lead-in wire in the low-voltage system to which low-voltage power is supplied between the pole transformer TR and the load facility of the customer. As an example of the "span", there is a cable which is buried in the ground. Further, regarding the wire W such as the high-voltage wire WH and the low-voltage wire WL, the number (for example, 3 or 2) of installation units of the power pole P can be collectively handled as one "span".

As an example of the node, there are a junction between the high-voltage wire WH and the switch SW illustrated in an enlarged view 21 in FIG. 2, a junction between the high-voltage wire WH and the pole transformer TR, and a junction between the pole transformer TR and the low-voltage wire WL. Besides, a connection point between the high-voltage wire WH21a and the high-voltage wire WH21b illustrated in an enlarged view 22 of FIG. 2 is also included in a category of the node. Specifically, even in a case where the high-voltage wire WH21a and the high-voltage wire WH21b are installed in the power pole P as a through pole, the high-voltage wire WH21a and the high-voltage wire WH21b are considered to be electrically connected, and a connection point between the high-voltage wires WH is considered as a virtual node.

As an example of the "branch", there are various types of facilities such as the power pole P, the high-voltage wire WH, the switch SW, the pole transformer TR, the low-voltage wire WL, and the like illustrated in FIG. 2. Besides, the power distribution substation, the lead-in wire, the smart meter, and the load facility (not illustrated) are also included in a category of the "branch". A facility positioned at the end point of the power distribution substation, the load facility, or the like may have one node.

Figure 3:
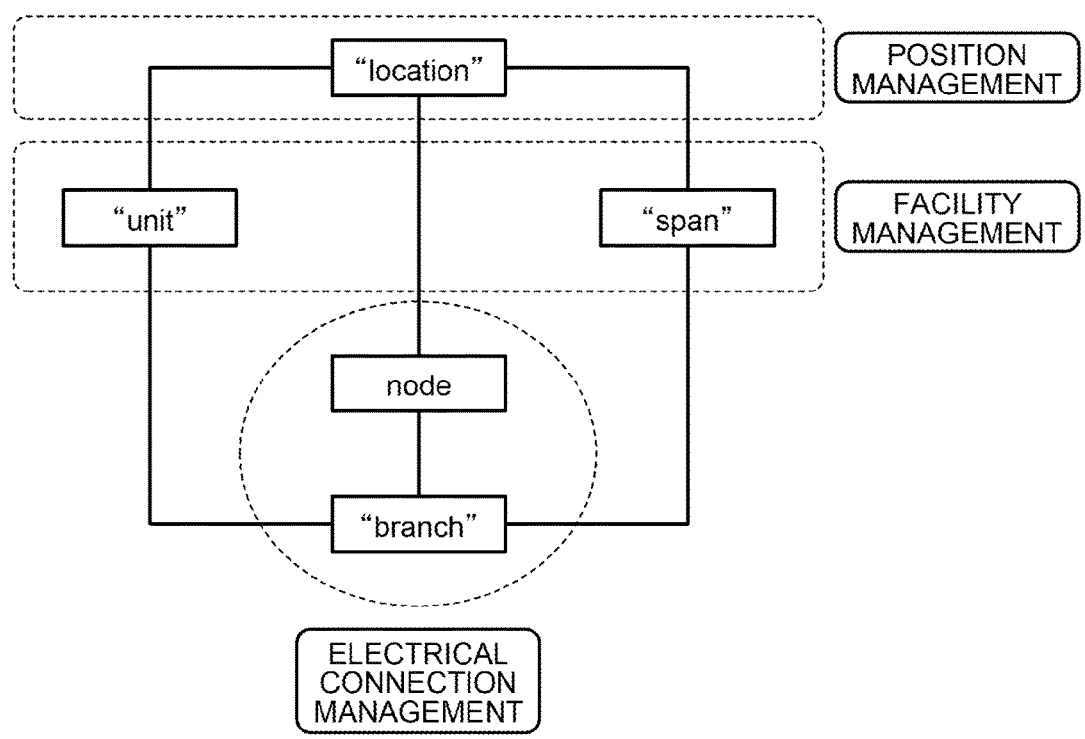
FIG. 3 is a diagram illustrating an example of a mutual relation of the entities.

The entities of the "location", the "unit", the "span", the node, and the "branch" have relevance as illustrated in FIG. 3. FIG. 3 is a diagram illustrating an example of a mutual relation of the entities. As illustrated in FIG. 3, the "location" is used for managing position information of the "unit" and the "span". In addition, the "branch" is used for managing facility information of the "unit" and the "span". Furthermore, the "location" and the "branch" are related by the node.

Returning to the description of FIG. 1, a "location" table 14a for managing the "location" is included in the position information 14. In addition, a "unit" table 15a for managing the "unit" and a "span" table 15b for managing the "span" are included in the facility information 15. Furthermore, a node table 16a for managing the node and a "branch" table 16b for managing the "branch" are included in the electrical connection information 16. In addition, as to be described below, a current node table 17a and a current "branch" table 17b are included in the power distribution system information 17.

Among them, as an aspect of the "location" table 14a, a table in which items such as a position ID (identifier), a position type, a longitude, and a latitude are associated can be employed. The "position ID" indicates identification information for identifying a position where the facility is provided. In addition, the "position type" indicates information for identifying a type of the position; for example, types of a power distribution substation (SS), an power pole (POLE), and a load facility (LOADL) are included. Further, the information stored in the "location" table 14a, for example, can acquire the position information of a specific facility such as the substation, the power pole, and the transformer from another existing system (for example, a power-distribution facility management system for managing the facilities in the power distribution system).

FIG. 4 is a diagram illustrating an example of the "location" table 14a. For example, a "location" of the position ID "SS0001" illustrated in FIG. 4 means that the power distribution substation is positioned at 128°08'48.66" east longitude and at 50°27'23.016" north latitude. In addition, in the subsequent drawings of FIG. 4, various types of IDs are indexed by adding a string identifiable for the various types of facilities such as "SS" indicating the power distribution substation, "PO" indicating the power pole, and "LL" indicating the load facility to the head of a string forming the ID. The indexing of these various types of IDs is not limited to the indexing obtained by adding the string identifiable for the various types of facilities to the head of the string forming the ID, but may be assigned with values which can be uniquely recognized. Further, herein, the longitude and the latitude are exemplified as an item for specifying the position of the facility, but another item (for example, local coordinates, addresses, and the like) may be used.

As an aspect of the "unit" table 15a, a table in which items such as a facility ID, a position ID, a type, and attribute information are associated can be employed. The "facility ID" indicates identification information for identifying the facility, and only the facility ID of the "unit" is stored in the "unit" table 15a. In addition, the "type" indicates a type of the "unit"; for example, the power pole (POLE), the switch (SW), the pole transformer (BANK), and the load facility (LOADL) are included. In addition, the "attribute information" indicates information relating to an attribute of the "unit"; for example, a serial number or performance of the "unit" is included (for example, in a case where the "unit" is a transformer, the capacity of the transformer is registered). The capacity of the transformer can be used to calculate a voltage drop when the electrical connection information of the facility of the current system is extracted. For example, in a case where the "unit" is the transformer, a resistance value, a reactance value, and a voltage ratio of the transformer are registered. Further, the information stored in the "unit" table 15a, for example, is acquired from another existing system (for example, a power-distribution facility management system), and the attribute information of the facility classified into the "unit" among the acquired attribute information of the facility is registered.

FIG. 5 is a diagram illustrating an example of the "unit" table 15a. For example, the facility ID "PO0001P1" illustrated in FIG. 5 means that the "unit" is at a position corresponding to the position ID "PO0001" (that is, 128°08'41.76" east longitude and 50°27'23.021" north latitude illustrated in FIG. 4) and is the power pole. In addition, the facility ID "PO000101" illustrated in FIG. 5 means that the "unit" is at a position corresponding to the position ID "PO0001" (that is, 128°08'41.76" east longitude and 50°27'23.021" north latitude illustrated in FIG. 4) and is the switch. In addition, the facility ID "PO000701" illustrated in FIG. 5 means that the "unit" is at a position corresponding to the position ID "PO0007" (that is, 128°08'34.30" east longitude and 50°27' 27.844" in the example of FIG. 4), and is the pole transformer having a resistance value of "36800Ω", a reactance value of "31300Ω", and a voltage ratio of 1.

As an aspect of the "span" table 15b, a table in which items such as a facility ID, a position $ID_1$, a position $ID_2$, a type, and attribute information are associated can be employed. The "facility ID" herein also indicates the identification information for identifying the facility, and only the facility ID of the "span" is stored in the "span" table 15b. In addition, the "position $ID_1$" indicates the position ID of one of two position IDs linked to the "span", and the "position $ID_2$" indicates the position ID of the other one of two position IDs linked to the "span". In addition, the "type" indicates a type of the "span"; for example, the high-voltage wire, the low-voltage wire, and the lead-in wire are included. In addition, the "attribute information" indicates information relating to the attribute of the "span"; for example, a serial number of the "span", a thickness, a material, a span size, a resistance value per unit (m), and a reactance value per unit (m) are included. The span size, the resistance value per unit, and the reactance value per unit can be used to calculate a voltage drop when the electrical connection information of the facility of the current system is extracted. Further, the information stored in the "span" table 15b, for example, is acquired from another existing system (for example, the power-distribution facility management system), and the attribute information of the facility classified into the "span" among the acquired attribute information of the facility is registered.

FIG. 6 is a diagram illustrating an example of the "span" table 15b. For example, the facility ID "SP0001" illustrated in FIG. 6 means that the "span" is a three-phase high-voltage wire installed in a section at positions corresponding to the position $ID_1$ "SS0001" and the position $ID_2$ "PO0001". The section corresponds to a section from 128°08'48.66" east longitude and 50°27'23.016" north latitude to 128°08'41.76" east longitude and 50°27'23.021" north latitude as described using FIG. 4. Furthermore, the span size, the resistance value, and the reactance value of the facility ID "SP0001" mean "21 m", "220 Ω/m", and "150 Ω/m", respectively. Further, in a case where the type illustrated in FIG. 6 is 3H, it means that the "span" is single-phase three high-voltage wires, and in a case where the type is 3L, it means that the "span" is single-phase three low-voltage wires. In addition, in a case where the type is a blank, it means that the "span" is a lead-in wire.

As an aspect of the node table 16a, a table in which items such as a node ID and a position ID are associated can be employed. The "node ID" indicates the identification information for identifying the node. Further, the information stored in the node table 16a is acquired from a power distribution automation system which performs a monitoring operation and a remote operation of the switch in another existing system (for example, the power-distribution facility management system and the power distribution system). For example, the node is extracted from the facility information of the low-voltage system acquired from the power-distribution facility management system or the facility information of the high-voltage system acquired from the power distribution automation system, and then the node is registered in the node table 16a in association with a predetermined position.

FIG. 7 is a diagram illustrating an example of the node table 16a. For example, the node ID "SS0001N01" illustrated in FIG. 7 means that the junction is at a position corresponding to the position ID "SS0001" (that is, 128°08'48.66" east longitude and 50°27'23.016" north latitude illustrated in FIG. 4). In addition, the node IDs "PO0001N01" and "PO0001N02" illustrated in FIG. 7 mean that the junctions are at the same position corresponding to the position ID "PO0001" (that is, 128°08'41.76" east longitude and 50°27'23.021" north latitude illustrated in FIG. 4).

As an aspect of the "branch" table 16b, a table in which items such as a branch ID, a node $ID_1$, a node $ID_2$, a facility ID, and an open/close division are associated can be employed. The "branch ID" indicates the identification information for identifying the "branch". In addition, the "node $ID_1$" indicates one node ID of two node IDs of the "branch", and "the node $ID_2$" indicates the other node ID of two node IDs of the "branch". However, the "branch" positioned at the end point of the power distribution substation or the load facility may have any one node ID in the node $ID_1$ and the node $ID_2$. For example, regarding the node $ID_1$ and the node $ID_2$, the node ID on the primary side from the node $ID_2$ (that is, the node ID of the junction near the substation) is registered in the node $ID_1$, and at the same time the node ID on the secondary side from the node $ID_1$ (that is, the node ID of the junction near the load facility) is registered in the node $ID_2$. In addition, the "facility ID" herein also indicates the identification information for identifying the facility, and the facility ID of any one of the "unit" and the "span" are stored in the "branch" table 16b. In addition, the "open/close division" indicates the open/close state of the switch. In the open/close division, in a case where the "branch" is a switch, an "open state" or a "close state" is set, but in a case where the "branch" is not the switch, a "blank" is registered.

Further, the information stored in the "branch" table 16b is acquired from another existing system (for example, the power-distribution facility management system and the power distribution automation system). For example, after the "branch" is extracted out of the facility information of the low-voltage system acquired from the power-distribution facility management system or the facility information of the high-voltage system acquired from the power distribution automation system, the extracted "branch" is registered in the "branch" table 16b in association with the node of the "branch".

FIG. 8 is a diagram illustrating an example of the "branch" table 16b. For example, the branch ID "BR0001" illustrated in FIG. 8 means that the "branch" is the high-voltage wire of the facility ID "SP0001" defined by the node $ID_1$ "SS0001N01" and the node $ID_2$ "PO0001N01". In addition, the branch ID "BR0002" illustrated in FIG. 8 means that the "branch" is the switch of the facility ID "PO000101" defined by the node $ID_1$ "PO0001N01" and the node $ID_2$ "PO0001N02", and since the open/close division is set to "1", it means that the switch is in the close state. Further, in a case where the open/close division illustrated in FIG. 8 is set to "0", it means that the switch is in the open state, and in a case where the open/close division is set to a blank, it means that the facility is not the switch. The close state of the switch indicates a conductive state, and the open state indicates a nonconductive state.

Further, in the information stored in the storage unit 13, the power distribution system information 17 and the display setting information 18 besides the position information 14, the facility information 15, and the electrical connection information 16 will be described below when functional units serving to generate, acquire, or use these pieces of information are described.

The controller 19 includes an internal memory for storing programs defining various processes and control data, and executes various processes using these programs and data. As illustrated in FIG. 1, the controller 19 includes a search unit 19*a*, an association unit 19*b*, an acquisition unit 19*c*, and a display controller 19*d*.

The search unit 19*a* is a processing unit which searches a "branch" corresponding to the subject combination with reference to the electrical connection information 16 while investigating an uninvestigated node among the nodes included in a node combination starting from a predetermined node.

As an aspect, the search unit 19*a* activates the process in a case where a browse request of the power distribution system information is received through the client terminal 30 or in a case where a certain time period elapses after the previous process is executed. First, the search unit 19*a* searches a position ID of which the position type is the power distribution substation "SS" among the position IDs stored in the "location" table 14*a*. Then, the search unit 19*a* registers the position ID of the power distribution substation SS investigated from the "location" table 14*a* in an investigation list stored in an internal memory (not illustrated). Besides the position ID of the power distribution substation SS as an investigation target, an uninvestigated node or an uninvestigated "branch" which is found out at the time of the investigation is registered in the investigation list whenever it is founded out. Further, herein, a case of searching the position ID of the power distribution substation SS from the "location" table 14*a* has been exemplified, but it may be configured to search a node ID starting with "SS" in a string among the node IDs stored in the node table 16*a* or the "branch" table 16*b*.

Subsequently, the search unit 19*a* selects one position ID of the power distribution substation SS registered in the investigation list. Then, the search unit 19*a* searches a node corresponding to the position ID of the power distribution substation SS on which the selection is previously performed among the nodes stored in the node table 16*a*. Thereafter, the search unit 19*a* registers a record of the node searched from the node table 16*a* in the current node table 17*a* stored as the power distribution system information 17 in the storage unit 13. Furthermore, the search unit 19*a* registers the node searched from the node table 16*a* in the investigation list. Further, in a case where the power distribution substation SS includes a plurality of SS banks, even when the search is performed using one position ID, the records of the plurality of nodes are searched.

Then, the search unit 19*a* selects one node registered in the investigation list. Subsequently, the search unit 19*a* searches a record of the "branch" having a combination of the node IDs in which the previously-selected node is included (that is, a combination of the node $ID_1$ and the node $ID_2$) among the "branches" stored in the "branch" table 16*b*. Thereafter, the search unit 19*a* registers the record of the "branch" searched from the "branch" table 16*b* to the current "branch" table 17*b* stored as the power distribution system information 17 in the storage unit 13. Furthermore, the search unit 19*a* registers the "branch" searched from the "branch" table 16*b* in the investigation list. At this time, the one registered in the investigation list may be information for identifying the "branch". For example, at least one of the branch ID or the facility ID may be registered.

Subsequently, the search unit 19*a* selects one "branch" registered in the investigation list. Then, the search unit 19*a* searches the attribute information corresponding to the facility ID of the "branch" on which the selection is previously performed from the "span" table 15*b*. At this time, in a case where the "branch" is a "span", the attribute information can be searched from the "span" table 15*b*, but in a case where the "branch" is a "unit", it is not possible to search the attribute information. For this reason, in a case where it is not possible to search the attribute information from the "span" table 15*b*, the search unit 19*a* searches the attribute information corresponding to the facility ID of the "branch" on which the selection is previously performed from the "unit" table 15*a*.

Thereafter, in a case where the other node paring with the node used in the investigation among the combination of the nodes is not a blank, the search unit 19*a* determines whether the subject "branch" is the switch. Then, in a case where the "branch" is a switch, the search unit 19*a* determines whether the switch is in the close state (that is, whether the open/close division is "1"). At this time, in a case where the switch is in the close state, the search unit 19*a* searches the record of the other node from the node table 16*a* and then registers the searched node in the current node table 17*a* of the power distribution system information 17. Furthermore, the search unit 19*a* adds the other node to the investigation list as the uninvestigated node.

Then, the search unit 19*a* repeatedly performs the processes from the selection of the uninvestigated "branch" to the current process until all the "branches" registered in the investigation list are investigated. Thereafter, when all the "branches" registered in the investigation list are investigated, the search unit 19*a* repeatedly performs the processes from the selection of the uninvestigated node to the current process until all the nodes registered in the investigation list are investigated. Then, the search unit 19*a* repeatedly performs the processes from the selection of the position ID of the uninvestigated power distribution substation SS to the current process until all the position IDs of the power distribution substations SS registered in the investigation list are investigated.

The association unit 19*b* is a processing unit which associates the facility (obtained from the combination of junctions where the investigation is performed and a result of the search) and the attribute information of a facility obtained as a result of the search among the attribute information contained in the facility information 15. As an aspect, the association unit 19*b* associates the record of the "branch" where the investigation is performed and the attribute information of the "branch" searched from the "span" table 15*b* or the "unit" table 15*a*. For example, the association unit 19*b* registers the attribute information of the "branch" in association with the facility ID or the branch ID of the "branch" used in the search of the "span" table 15*b* or the "unit" table 15*a* among the records stored in the current "branch" table 17*b*. At this time, the association unit 19*b* searches the position ID corresponding to the facility ID of the "branch" from the "unit" table 15*a* or the "span" table 15*b* and then further associates the position ID.

Herein, a processing content of the search unit 19*a* and the association unit 19*b* will be specifically described using the respective tables of FIGS. 4 to 8. First, the position ID "SS0001" of which the position type is the power distribution substation "SS" is searched among the position IDs stored in the "location" table 14a illustrated in FIG. 4. Then, the position ID "SS0001" of the power distribution substation SS searched from the "location" table 14a is registered in the investigation list. In this case, since only the position ID "SS0001" of the power distribution substation SS is registered in the investigation list, the position ID "SS0001" is selected. Then, the node ID "SS0001N01" corresponding to the position ID "SS0001" of the power distribution substation SS on which the selection is previously performed is searched among the nodes stored in the node table 16a illustrated in FIG. 7. Subsequently, the record of the node ID "SS0001N01" searched from the node table 16a is registered in the current node table 17a. Furthermore, the node ID "SS0001N01" searched from the node table 16a is registered even in the investigation list. In this case, since only the node ID "SS0001N01" is registered in the investigation list, the node ID "SS0001N01" is selected.

Then, the node $ID_1$ "SS0001N01" is searched among the "branches" stored in the "branch" table 16b illustrated in FIG. 8, and the "branch" of the facility ID "SP0001" having the combination of the node $ID_1$ "SS0001N01" and the node $ID_2$ "PO0001N01" is found. Thereafter, the record of the "branch" of the facility ID "SP0001" searched from the "branch" table 16b is registered in the current "branch" table 17b. Furthermore, the facility ID "SP0001" searched from the "branch" table 16b is registered in the investigation list. In this case, since only the facility ID "SP0001" is registered in the investigation list, the facility ID "SP0001" is selected.

Then, the attribute information "span size 21 m, resistance $R_{H1}$, reactance $X_{H1}$" of the "span" corresponding to the facility ID "SP0001" on which the selection is previously performed is searched from the "span" table 15b illustrated in FIG. 6. Further, herein, the description has been made about a case where the attribute information of the "span" is searched. However, in a case where the facility ID starts with a string other than "SP", the attribute information is not searched from the "span" table 15b, but the attribute information of the "unit" is searched from the "unit" table 15a illustrated in FIG. 5.

From the attribute information "span size 21 m, resistance 220 Ω/m, reactance 150 Ω/m" thus obtained, a resistance value of 4621 (220×21) Ω and a reactance value of 3150 (150×21) Ω are registered in the current "branch" table 17b in association with the record of the "branch" of the facility ID "SP0001" used in searching the "span" table 15b.

Thereafter, the other node ID "PO0001N01" paring with the node ID "SS0001N01" used in the investigation is set as a value in the combination of the node $ID_1$ "SS0001N01" and the node $ID_2$ "PO0001N01". In this way, since the other node ID is not a blank, it is determined whether the "branch" of the subject facility ID "SP0001" is a switch. Then, in the "branch" of the facility ID "SP0001", a value of the open/close division is a blank, and the "branch" is not the switch. Therefore, the record of the other node ID "PO0001N01" is searched from the node table 16a and then the record of the other node ID "PO0001N01" is registered in the current node table 17a of the power distribution system information 17. Furthermore, the other node ID "PO0001N01" is added to the investigation list as an uninvestigated node.

In this way, at the time when the other node ID "PO0001N01" is registered in the investigation list as an uninvestigated node, the node ID other than the node ID "PO0001N01" is not registered. Therefore, the node ID "PO0001N01" is investigated and then the search is kept on.

Further, herein, the case where the other node ID is not a blank has been exemplified, but in a case where the other node ID is a blank, the investigation of the uninvestigated "branch" registered in the investigation list is performed. In addition, when the uninvestigated "branch" is not present, the investigation of the uninvestigated node is performed. Then, when the position ID of the uninvestigated power distribution substation SS is not present, the investigation is ended. In addition, herein, the case where the "branch" is not a switch has been exemplified, but in a case where the "branch" is a switch, when the switch is not in the close state, the search of the other node ID and the addition of the other node to the investigation list are not performed. This is because in a case where the switch is in the open state, when the search of the other node ID and the addition of the other node to the investigation list are performed, another power distribution system which is not electrically connected is erroneously registered in the current node table 17a or the current "branch" table 17b.

Through the above investigation, it is possible to generate the current node table 17a containing nodes of the power distribution system of which facilities are electrically connected to each other at the time of investigation among the "branches" registered in the node table 16a. Furthermore, through the above investigation, it is possible to generate the current "branch" table 17b in which "branches" electrically connected to each other in the power distribution system and the attribute information corresponding to the "branch" at the time of investigation are searched among the "branches" registered in the "branch" table 16b and then the "branch" and the attribute information are associated. Further, in the following, the power distribution system of which the facilities are electrically connected to each other at the time of investigation may be referred to as a "current system".

The power distribution system information 17 containing the current node table 17a and the current "branch" table 17b thus generated is registered in the storage unit 13. FIG. 9 is a diagram illustrating an example of the current node table 17a. FIG. 10 is a diagram illustrating an example of the current "branch" table 17b. In FIGS. 9 and 10, the current node table 17a and the current "branch" table 17b which are generated by using the respective tables illustrated in FIGS. 4 to 8 are illustrated starting from the node ID "SS0001N01".

As illustrated in FIG. 9, among the records of the current node table 17a, the power consumption (as an example of the attribute information) measured by a meter such as a smart meter is registered in the records of the nodes "LL0001N01", "LL0002N01", "LL0003N01", "LL0004N01", "LL0005N01", "LL0006N01", "LL0007N01", and "LL0008N01" which are the junctions between the load facilities of the customers and the facilities of the power distribution system. The power consumption contains "effective power" which is consumed by the load facility and "reactive power" which is not consumed by the load facility. Among them, the reactive power is called delay reactive power. The power consumption (effective) and the power consumption (reactive) are referred in a case where the power of each node is calculated.

As illustrated in FIG. 10, the value of the open/close division registered in the "branch" table 16b is registered in a record in which the facility of the "branch" is a switch among the records of the current "branch" table 17b. For example, since all the open/close divisions are registered with a value of "1" in the switch of the branch IDs "BR0002", "BR0006", and "BR0019", it means that the switches are in the close state and in the energizing state. In FIG. 10, the switch of which the open/close division is "1" has been exemplified, in a case where the open/close division of the switch is "0", it means that the switch is in the open state and not in the energizing state. In addition, a reactance value X and a resistance value R (as an example of the attribute information) are registered in the respective records of the current "branch" table 17b. Among them, in a case where the facility of the "branch" is a "unit" (for example, the switch or the transformer), the reactance value X and the resistance value R registered in the "unit" table 15a are registered as the attribute information without any change. On the other hand, in a case where the facility of the "branch" is a "span", a value obtained by multiplying the value of the span size by the reactance value per unit registered in the "span" table 15b is registered as the reactance value X, and a value obtained by multiplying the value of the span size by the resistance value per unit is registered as the resistance value R. The reactance value X and the resistance value R of these "unit" and "span" are referred in a case where a voltage at each node is calculated.

Further, herein, the power consumption (effective), the power consumption (reactive), the resistance value, and the reactance value have been exemplified as a parameter used for calculating the voltage, a connection phase item to which the transformer is connected is added in any one of the current node table 17a or the current "branch" table 17b, so that the calculation of the voltage can be accurately performed. For example, in a case where the wires are the single-phase three wires, a first transformer connected to the wire on a pole is referred to as "connection phase 1", a second one is referred to as "connection phase 2", and a third one is referred to as "connection phase 3". Further, in a case where the transformer is connected to the first and second wires of the three wires, a value of "A" can be registered, in a case where the second and third wires are connected to the transformer, the value of "B" can be registered, and in a case where the first and third wires are connected to the transformer, a value of "C" can be registered.

Figure 11:
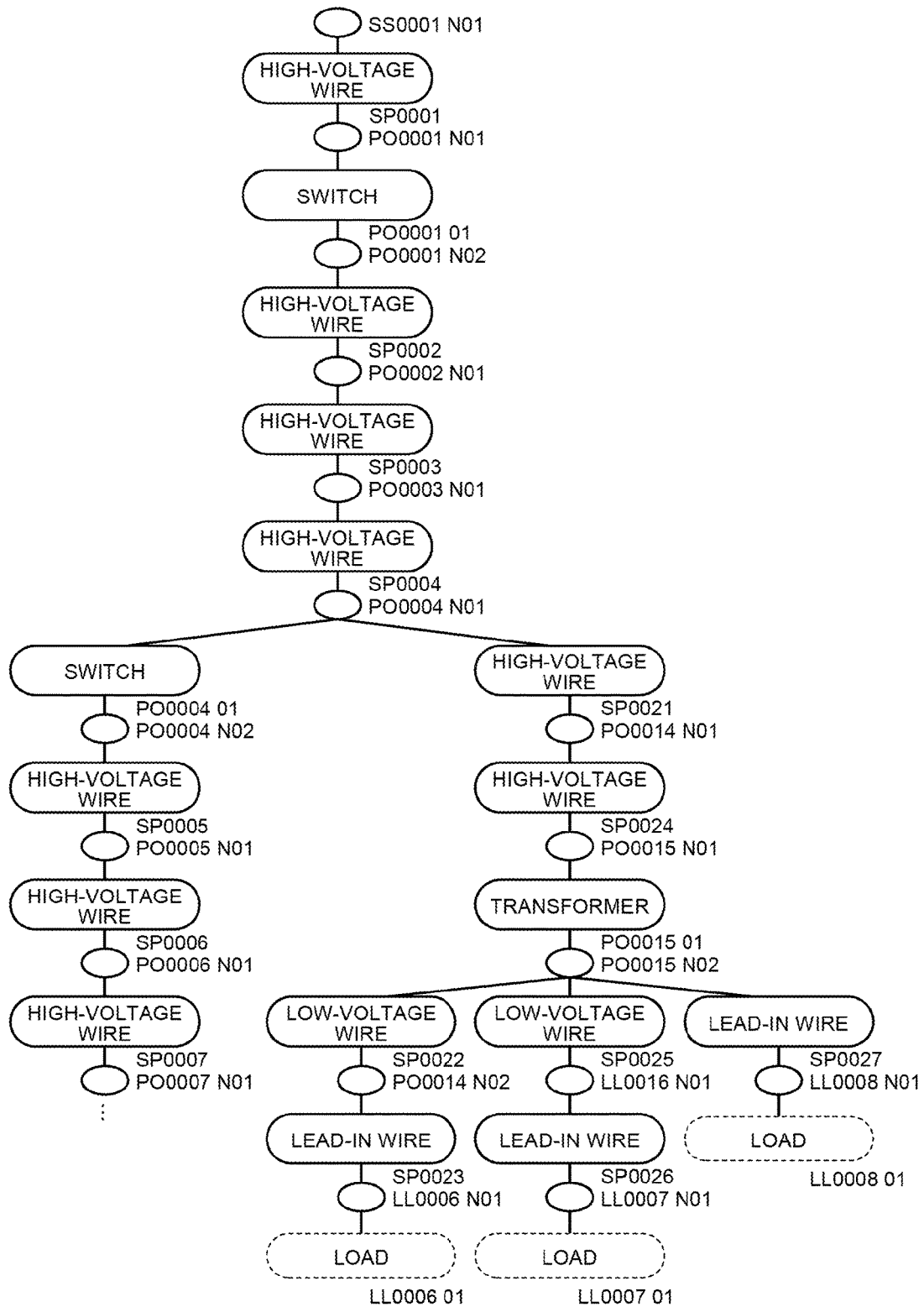
FIG. 11 is a diagram (1) illustrating an example of display data.
Figure 12:
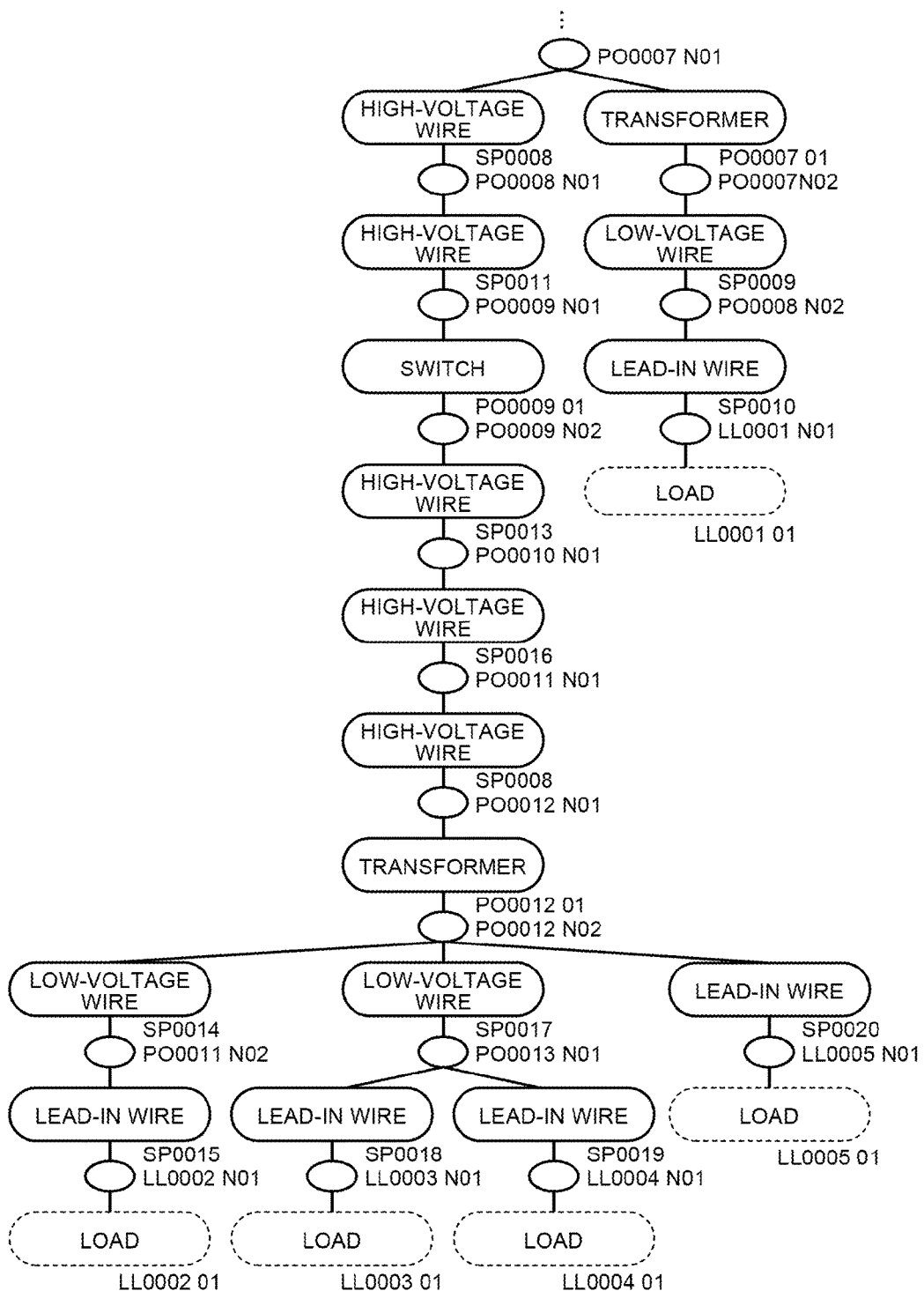
FIG. 12 is a diagram (2) illustrating an example of the display data.

As described above, the current node table 17a illustrated in FIG. 9 and the current "branch" table 17b illustrated in FIG. 10 indicate graphs of the power distribution system illustrated in FIGS. 11 and 12. FIGS. 11 and 12 are diagrams illustrating an example of the graph structure of the current system. The current system illustrated in FIGS. 11 and 12 has a node of a node ID "SS0001N01" which represents a junction between the SS bank and a high-voltage wire of a facility ID "SP0001" as a root (layer 1) of a hierarchical structure. Furthermore, the current system has a route from the root toward eight load facilities of the facility IDs "LL000101", "LL000201", "LL000301", "LL000401", "LL000501", "LL000601", "LL000701", and "LL000801" at the end terminal. In the drawing, it can be seen that the layers from the SS bank to the load facility of the facility ID "LL000801" are the shallowest as 10 layers, and the layers from the SS bank to the load facilities of the facility IDs "LL000201", "LL000301" and "LL000401" are the deepest as 19 layers. In this way, with the power distribution system information 17 thus generated, the electrical connection in the current system can be ascertained by subdividing the system in a unit of facility or a unit of junction between the facilities not in a rough unit such as the high-voltage system or the low-voltage system.

Herein, another example of the current node table 17a and the current "branch" table 17b will be described. FIG. 29 is a diagram illustrating an example of the current node table 17a. FIG. 30 is a diagram illustrating an example of the current "branch" table 17b. Further, the tables illustrated in FIGS. 29 and 30 are substantially similar to the node table 16a illustrated in FIG. 7 and the "branch" table 16b illustrated in FIG. 8, and while items used for the detection of the abnormal "branch" are added to be illustrated, items not used for the detection of the abnormal "branch" are omitted. For example, the item of the energizing state used for the detection of the abnormal "branch" is added in the current node table 17a illustrated in FIG. 29 compared to the node table 16a illustrated in FIG. 7, and the position ID is not denoted, but the position ID is normally considered also to be registered even though not being denoted. In addition, while the open/close division not used for the detection of the abnormal "branch" is not denoted in the current "branch" table 17b illustrated in FIG. 30, the open/close division is normally considered also to be registered even though not being denoted.

Returning to the description of FIG. 1, the acquisition unit 19c is a processing unit which acquires a display setting of a screen displayed in the client terminal 30. As an aspect, in a case where the browse request for the power distribution system screen is received from the client terminal 30, the acquisition unit 19c can acquire the display setting information 18 stored in the storage unit 13.

Herein, an example of the display setting information 18 stored in the storage unit 13 will be described. In the display setting information 18, for example, data associated with items such as a map display range and a map scale can be employed. Among them, an example of the map display range includes an area in which a power distribution system having a high importance in the map display range or in the service area of the electric power provider at the time when the last power distribution system screen is browsed. Such a map range, for example, can be defined by an element such as a specific point on the power distribution system screen (for example, the left upper vertex or the center of the screen, the width and the height of the screen, and the like). In addition, as an example of the map scale, the map scale itself may be used, a level associated with a certain scale (for example, a "broad-area map" drawn on a scale smaller than a detailed map and a "detailed map" drawn on a scale larger than the broad-area map) may be used.

As another aspect, in a case where the browse request for the power distribution system screen is received from the client terminal 30, the acquisition unit 19c may acquire the display setting by receiving an input of the display setting of the power distribution system screen from the client terminal 30.

Figure 13:
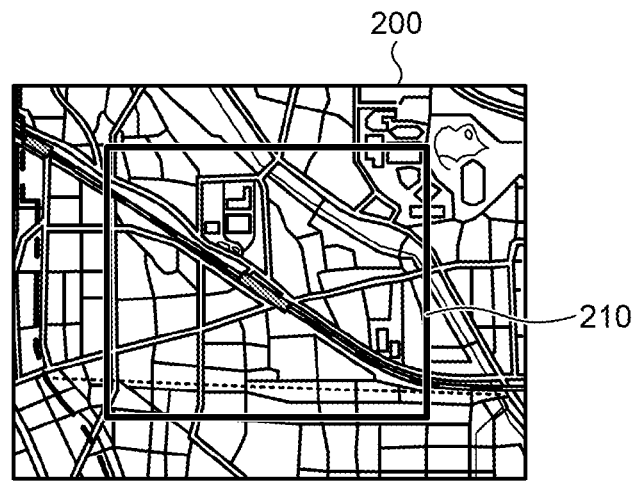
FIG. 13 is a diagram illustrating an example of a reception screen for a display setting.
Figure 14:
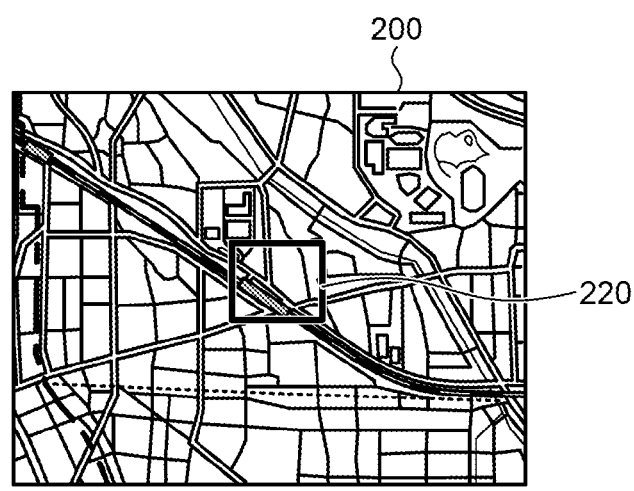
FIG. 14 is a diagram illustrating an example of the reception screen for the display setting.

FIGS. 13 and 14 are diagrams illustrating an example of a reception screen of the display setting. In a reception screen 200 of the display setting illustrated in FIGS. 13 and 14, there is illustrated an entire area map which contains the entire area managed by one power distribution substation. In FIG. 13, in a case where the map scale is the "broad-area map", there is illustrated a focusing box 210 which is used to set the display range of the power distribution system screen on the entire area map. On the other hand, in FIG. 14, in a case where the map scale is the "detailed map", there is illustrated a focusing box 220 which is used to set the display range of the power distribution system screen on the entire area map. In such the reception screen 200, any one of the focusing box 210 or the focusing box 220 can be freely switched by operating a switching button (not illustrated) or the like. In addition, the map scale may be selected from a pull-down menu, or an arbitrary scale may be input from a form. In addition, the map display range displayed in the power distribution system screen can be set by moving the focusing box 210 or the focusing box 220 to a predetermined position on the reception screen 200 illustrated in FIGS. 13 and 14. Further, the reception screen 200 of the display setting may be temporarily displayed in a case where the browse request for the power distribution system screen is received, or may be normally displayed at a position different from a position at which the power distribution system screen is displayed in a window.

The display controller 19d is a processing unit which performs display control on the client terminal 30. As an aspect, the display controller 19d generates the display data of the power distribution system screen according to the display setting acquired by the acquisition unit 19c and then displays the power distribution system screen in the client terminal 30. Further, the description herein has been made about a case where the display data is displayed in the client terminal 30, but it may be displayed in a display unit of the power distribution management apparatus 10 or another apparatus.

In this regard, the display controller 19d acquires position IDs contained in a predetermined range from the "location" table 14a. Then, the display controller 19d acquires the records of "units" and "spans" having the position IDs in the predetermined range from the "unit" table 15a and the "span" table 15b. Subsequently, the display controller 19d extracts a record of which the facility ID is recorded in the "branch" table 16b among the records of the "units" and the "spans". Therefore, a "unit" and a "span" contained in the current system are extracted even among the "units" and the "spans". Thereafter, the display controller 19d determines whether the map scale of the display setting is the "broad-area map" or the "detailed map". Further, the description herein has been made about a case where the map scale is any one of the "broad-area map" and the "detailed map", but it may also be determined about whether the map scale is equal to or smaller than a predetermined threshold.

Herein, in a case where the map scale is the "broad-area map", the number of facilities displayed in the power distribution system screen is large compared to the detailed map, and the display sizes of symbols and figures of the facilities become small. Therefore, the display controller 19d displays only the facilities of the high-voltage system among the facilities contained in the current system. For example, the display controller 19d extracts the high-voltage facilities (that is, a transformer, a high-voltage wire, a switch, and the like) with reference to the types contained in the records of the "units" and the "spans" which are read previously. Thereafter, the display controller 19d generates display data of the broad-area map by disposing the facilities of the high-voltage system in a map image of the display range cut out of map information stored in the storage unit 13 using position information such as a longitude and a latitude corresponding to the position IDs of the "unit" and the "span".

Figure 15:
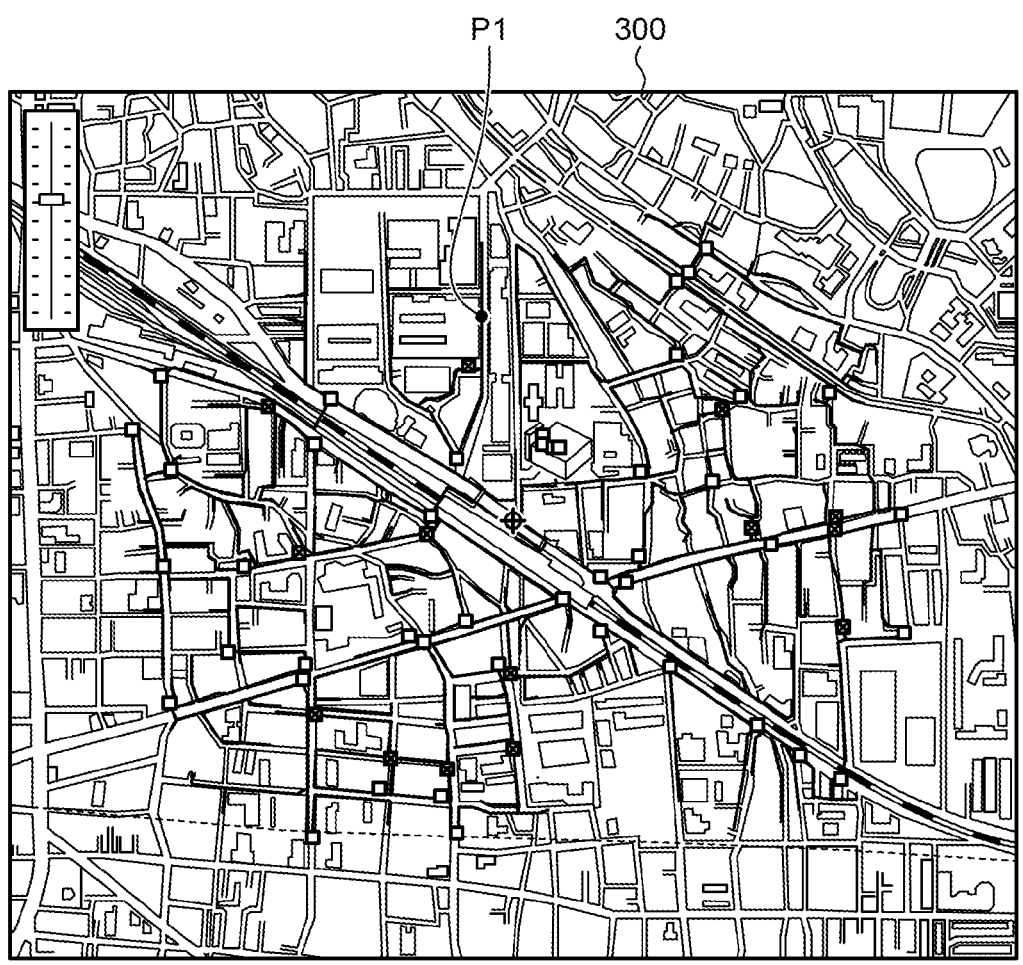
FIG. 15 is a diagram illustrating an example of a power distribution system screen.

FIG. 15 is a diagram illustrating an example of the power distribution system screen. In FIG. 15, there is illustrated a broad-area map 300 in a case where the focusing box 210 is set at the position illustrated in FIG. 13 on the reception screen 200 for the broad-area map illustrated in FIG. 13. As illustrated in FIG. 15, the power distribution system supplied from the SS bank is illustrated in the broad-area map 300. Herein, in the broad-area map 300, only the facilities of the high-voltage system containing the substation, the high-voltage wire, and the switch are illustrated among the facilities contained in the respective power distribution system, but the facilities of the low-voltage system are not illustrated. Therefore, even in a case where the scale is set to be small and the number of facilities is increased and thus the symbols and the display sizes of the facilities become small, the visibility of the facility of the high-voltage system is improved in proportion as the facility of the low-voltage system is not displayed by the reduced amount of the scale. The broad-area map 300 can be used suitable for a case where the voltage of the facility contained in the high-voltage system is adjusted.

On the other hand, in a case where the map scale is the "detailed map", the number of facilities displayed in the power distribution system screen becomes small compared to the broad-area map, the symbols of the facilities and the display sizes of the figures also become large. In this case, the display controller 19d displays both the facilities of the high-voltage system and the facilities of the low-voltage system among the facilities contained in the current system. For example, the display controller 19d generates display data of the detailed map by disposing the facilities of the high-voltage system and the low-voltage system in the map image of the display range cut out of the map information stored in the storage unit 13 using the position information such as the longitude and the latitude corresponding to the position IDs of the "unit" and the "span" which are read previously.

Figure 16:
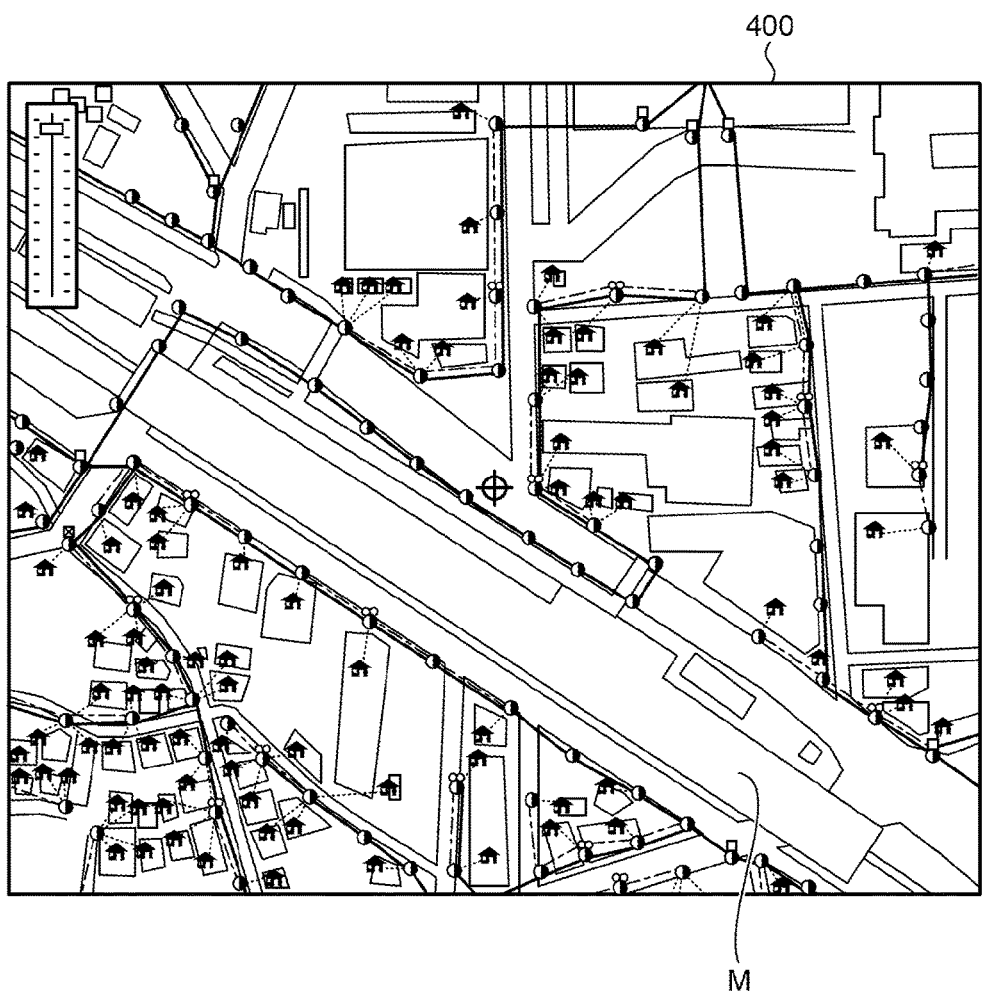
FIG. 16 is a diagram illustrating an example of the power distribution system screen.

FIG. 16 is a diagram illustrating an example of the power distribution system screen. In FIG. 16, there is illustrated a detailed map 400 in a case where the focusing box 220 is set at the position illustrated in FIG. 14 on the reception screen 200 for the detailed map illustrated in FIG. 14. As illustrated in FIG. 16, the power distribution system in the vicinity of Station "M" is illustrated in the detailed map 400. Herein, in the detailed map 400, the low-voltage system containing the pole transformer, the low-voltage wire, the lead-in wire, and the load facility are also illustrated together with the facilities of the high-voltage system containing the substation, the high-voltage wire, and the switch. Therefore, in a case where the scale is set to be large and the number of facilities is decreased and thus the symbols and the display sizes of the facilities become large, the power distribution system can be displayed in detail while suppressing that the visibility is degraded in proportion as the facilities of both the high-voltage system and the low-voltage system are displayed. In a case where the voltage adjustment is performed by the pole transformer or the like to check an influence range, it is possible to confirm through the detailed map 400 the influence to both the high-voltage system and the low-voltage system on the boundary of the transformer, so that it is appropriately used in a case where the voltage adjustment of the facility contained in the low-voltage system.

As another aspect, in a case where a change request for the scale is received from the client terminal 30, the display controller 19d regenerates the display data of the power distribution system screen in which the map and the facilities are enlarged or reduced on the received scale in response to the change request.

For example, in a case where the change request for changing the scale is received from the detailed map to the broad-area map, the display controller 19d reads the records of the "units" and the "spans" having the position IDs of the nodes contained in a predetermined range on the changed scale. Thereafter, the display controller 19d regenerates the display data of the broad-area map by disposing the facilities of the high-voltage system in the map image of the display range with reference to the type contained in the records of the "units" and the "spans" which are read previously, using the position information such as the longitude and the latitude corresponding to the position IDs of the facilities of the high-voltage system.

On the other hand, in a case where the change request for changing the scale is received from the broad-area map to the detailed map, the display controller 19d reads the records of the "units" and the "spans" having the position IDs of the nodes contained in a predetermined range on the changed scale. Thereafter, the display controller 19d regenerates the display data of the detailed map by disposing the facilities of the high-voltage system and the low-voltage system in the map image of the display range using the position information such as the longitude and the latitude corresponding to the position IDs of the "units" and the "spans" which are read previously. Further, the description herein has been made about a case where the scale is changed between the broad-area map and the detailed map, but the scale may be changed by a value. For example, in a case where the scale is changed to be equal to or less than a predetermined threshold, the display controller 19d displays only the facilities of the high-voltage system in the client terminal 30. In a case where the scale is changed to exceed the threshold, the facilities of the power distribution system are displayed in the client terminal 30.

As still another aspect, in a case where a facility contained in the power distribution system screen is designated from the client terminal 30, the display controller 19d changes the display mode of the designated facility and the power distribution system to which the facility belongs.

For example, in a case where the facility of the high-voltage system is designated on the screen of the broad-area map, the display controller 19d searches a "branch" at the designated position from the "branch" table 16b. Then, the display controller 19d registers the "branch" searched from the "branch" table 16b in the investigation list. Subsequently, the display controller 19d selects one "branch" from the investigation list. Furthermore, the display controller 19d registers the node of the subject "branch" in the investigation list. Then, the display controller 19d selects one node from the investigation list. Subsequently, the display controller 19d searches the "branch" having the node previously selected from the "branch" table 16b. Then, the display controller 19d determines whether the "branch" searched from the "branch" table 16b is a facility of the high-voltage system. At this time, in a case where the "branch" is a facility of the high-voltage system, the display controller 19d registers the subject "branch" in a display change list stored in an internal memory (not illustrated), and the subject "branch" is also registered in the investigation list. The display change list is a list of "branches" which are changed in the display mode different from that of the "branches" not registered in the list. Thereafter, the display controller 19d repeatedly searches the "branch" and determines whether the "branch" belongs to the high-voltage system until an unregistered node disappears from investigation list. Then, when an uninvestigated node disappears from the investigation list, the display controller 19d repeatedly performs processes from the selection of the "branch" to the determination on the belonging to the high-voltage system until an uninvestigated "branch" disappears from the investigation list. Thereafter, the display controller 19d generates the display data of the power distribution system screen in which the display mode of the facility of the high-voltage system registered in the display change list is changed to a display mode different from that of the other "branches". At this time, the display controller 19d may erase the facilities other than the facility of the high-voltage system registered in the display change list from the map.

Figure 17:
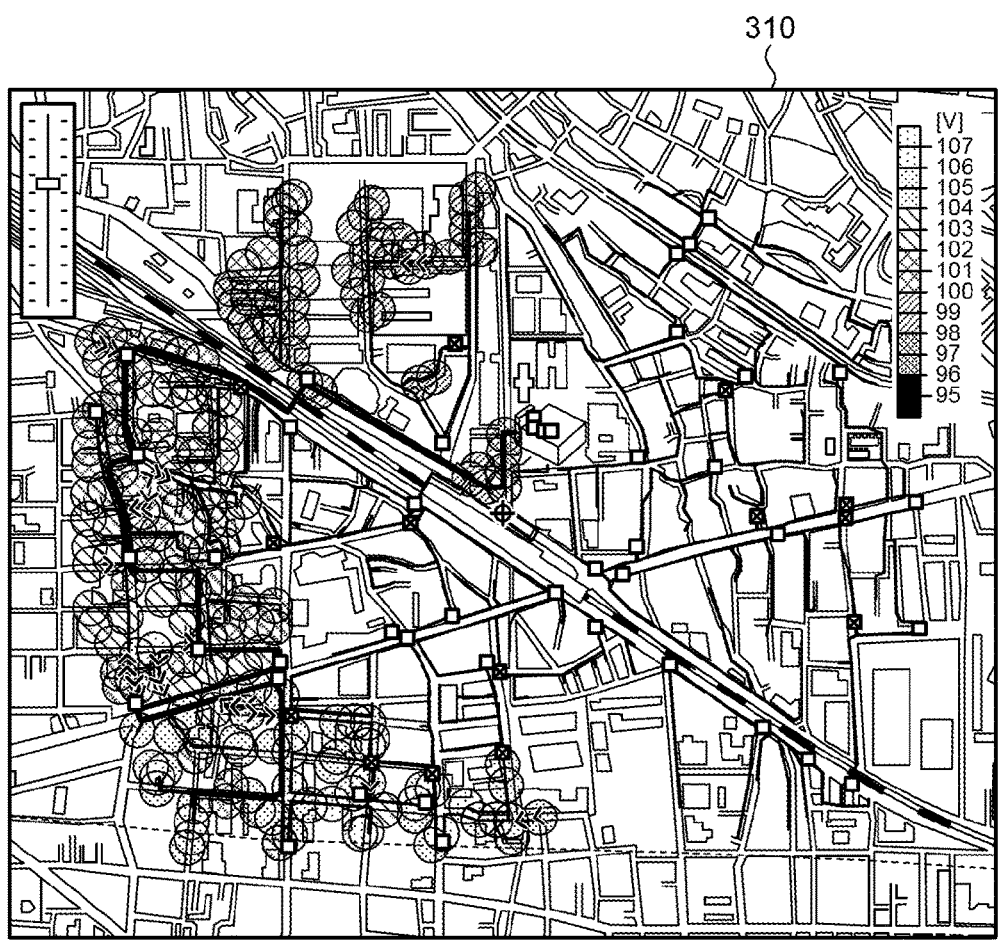
FIG. 17 is a diagram illustrating an example of the power distribution system screen.

FIG. 17 is a diagram illustrating an example of the power distribution system screen. In FIG. 17, there is illustrated a broad-area map 310 in which the display of the facility of the high-voltage system is changed in a case where a position P1 at which the facility of the high-voltage system is displayed on the broad-area map 300 illustrated in FIG. 15 is designated. As illustrated in FIG. 17, in the broad-area map 310, the color or the thickness of the high-voltage system to which the high-voltage wire on the position P1 belongs is displayed in a mode different in color or thickness from the other facilities of the high-voltage system. Therefore, it is possible to realize the highlighting of the high-voltage system in which the position P1 is designated. Furthermore, even though the symbols and the figures of the facilities of the low-voltage system are not displayed in the broad-area map 310, the voltages of the load facilities are expressed by circular filling patterns distinguished in color for each predetermined voltage within a predetermined allowable range from a predetermined standard voltage. As illustrated in FIG. 17, it can be easily ascertained that a portion expressed with the filling pattern at a point near the upper limit of the allowable range is a load facility having a distributed power source such as a photovoltaic solar panel. The distribution and the voltage values of the facilities from which a reverse power flow may occur can be effectively utilized to select the voltage of any one of the transformer and the switch for adjustment.

In addition, in a case where a facility of the low-voltage system on the screen of the detailed map is designated, the display controller 19d searches a "branch" at the designated position from the "branch" table 16b. Then, the display controller 19d registers the "branch" searched from the "branch" table 16b in the investigation list. Subsequently, the display controller 19d selects one "branch" from the investigation list. Furthermore, the display controller 19d registers the node of the subject "branch" in the investigation list. Then, the display controller 19d selects one node from the investigation list. Subsequently, the display controller 19d searches the "branch" having the node previously selected from the "branch" table 16b. Then, the display controller 19d determines whether the "branch" searched from the "branch" table 16b is a facility of the low-voltage system. At this time, in a case where the "branch" is a facility of the low-voltage system, the display controller 19d registers the subject "branch" in a display change list, and the subject "branch" is also registered in the investigation list. Thereafter, the display controller 19d repeatedly searches the "branch" and determines whether the "branch" belongs to the low-voltage system until an unregistered node disappears from investigation list. Then, when an uninvestigated node disappears from the investigation list, the display controller 19d repeatedly performs processes from the selection of the "branch" to the determination on the belonging to the high-voltage system until an uninvestigated "branch" disappears from the investigation list. Thereafter, the display controller 19d generates the display data of the power distribution system screen in which the display mode of the facility of the low-voltage system registered in the display change list is changed to a display mode different from that of the other "branches". At this time, the display controller 19d may erase the facilities of the power distribution system other than the power distribution system containing the facilities of the low-voltage system registered in the display change list from the map.

Figure 18:
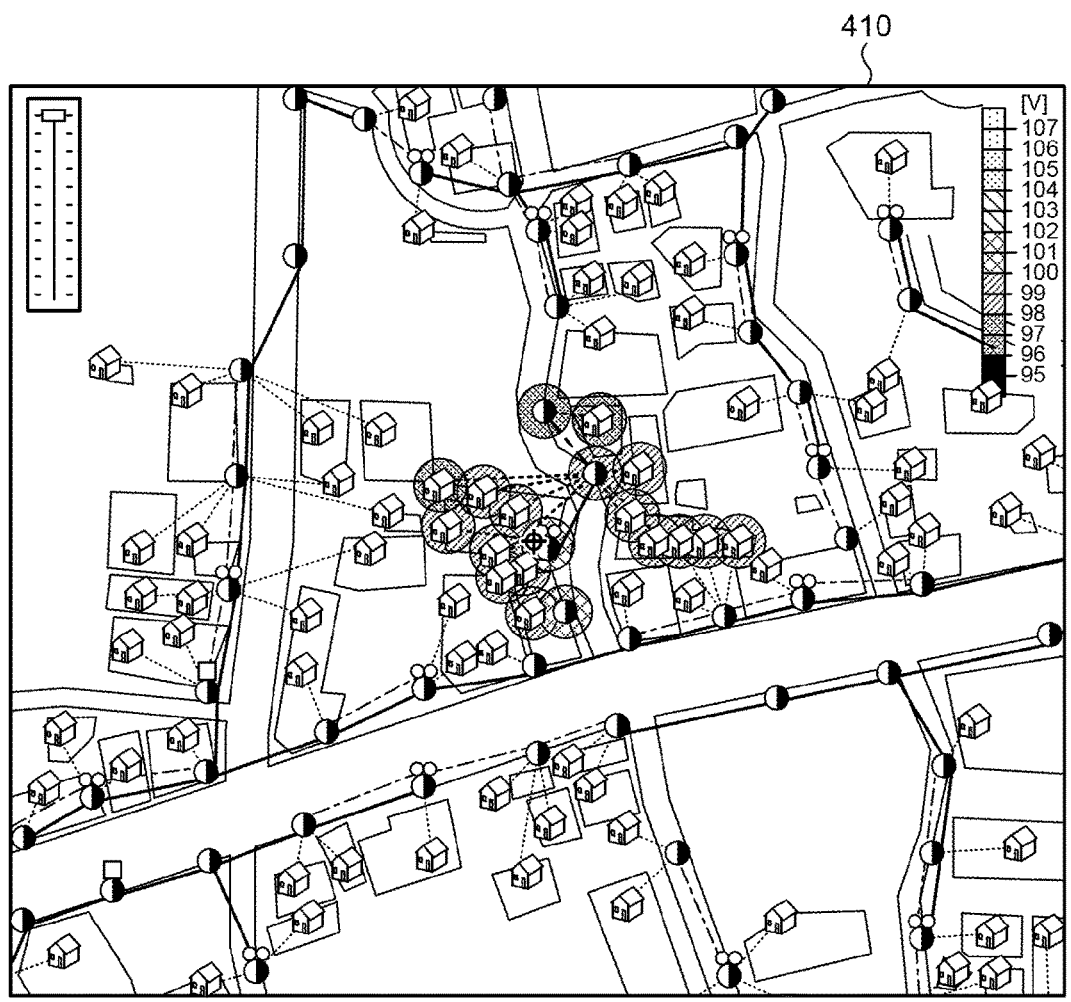
FIG. 18 is a diagram illustrating an example of the power distribution system screen.

FIG. 18 is a diagram illustrating an example of the power distribution system screen. In FIG. 18, there is illustrated the detailed map 410 in which the display of the facility of the low-voltage system is changed in a case where a display position of the facility of the low-voltage system is designated on the detailed map. As illustrated in FIG. 18, in the detailed map 410, the color or the thickness of the facility of the low-voltage system designated in its position is displayed in a mode different from that of the other facilities of the low-voltage system. For example, in the detailed map 410, there is expressed the circular filling patterns which are distinguished in color by a predetermined voltage (for example, 1 V) from 95 V to 106 V (from the standard voltage (for example, 101 V) to the allowable range (for example, ±6)). Therefore, the low-voltage system can be highlighted. Furthermore, in the detailed map 410, a route from the pole transformer to the load facility through the lead-in wire is also displayed. Therefore, since the load facility likely to be influenced in a case where the voltage of the pole transformer is changed can be ascertained at a glance, the voltage adjustment in the pole transformer can be effectively utilized.

As another aspect, the display controller 19d may generate the display data of the graph structure of the current system. For example, the display controller 19d selects a predetermined facility ID (for example, the facility ID of the power distribution substation SS or an arbitrary facility ID received from the client terminal 30) among the facility IDs contained in the "branch" table 16b stored in the storage unit 13. Then, the display controller 19d sets the node ID closest to the power distribution substation SS among the combinations of the node IDs associated with the previously-selected facility IDs to a root of the hierarchical structure. Subsequently, the display controller 19d generates the display data of the graph structure of the current system in which the facility is disposed between the respective nodes from the root to the end terminal while the layer number assigned to the node is lowered as many as the nodes passing through from the root to the facility ID of the load facility.

Figure 19:
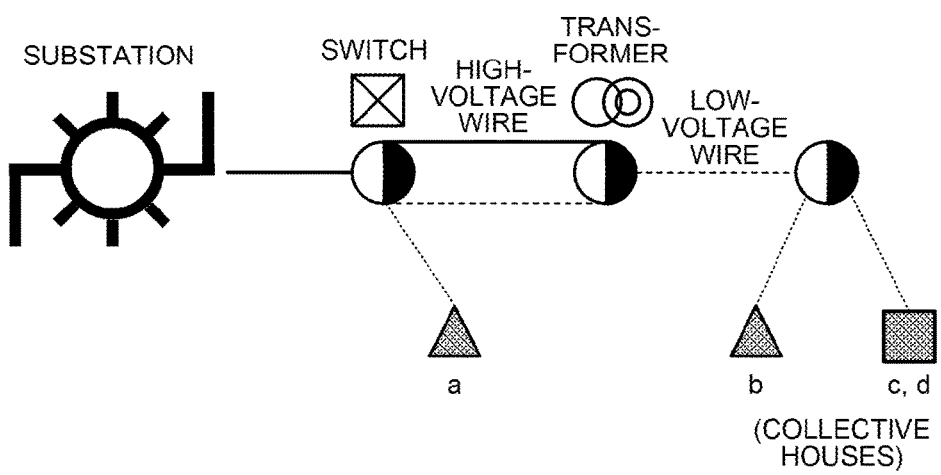
FIG. 19 is a diagram illustrating an example of the power distribution system screen.
Figure 20:
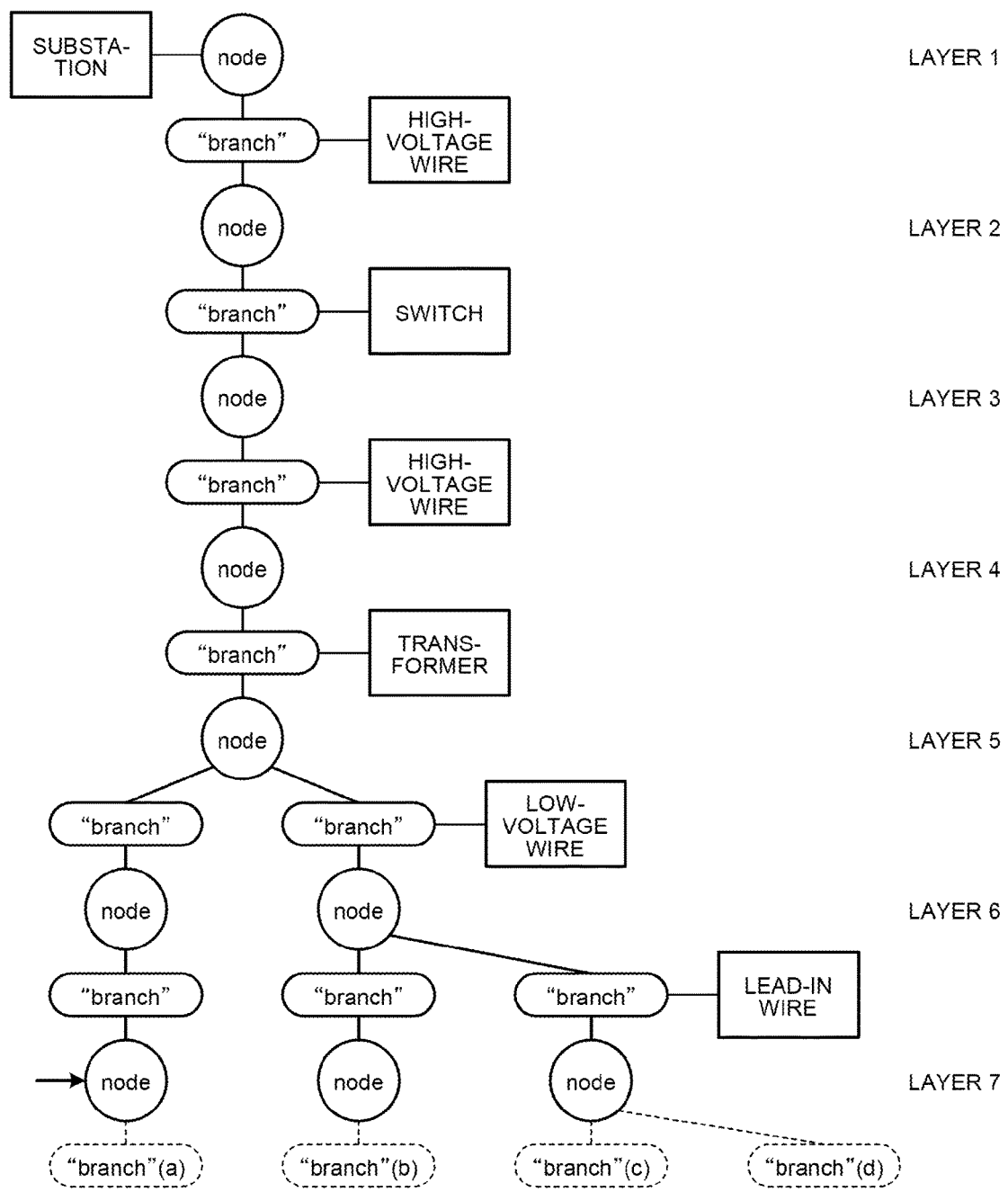
FIG. 20 is a diagram illustrating an example of display data of a graph structure.

Herein, a merit on displaying the graph structure will be described using FIGS. 19 and 20. FIG. 19 is a diagram illustrating an example of the power distribution system screen. FIG. 20 is a diagram illustrating an example of the display data of the graph structure. FIGS. 19 and 20 illustrate the power distribution system generated from the current node table 17a illustrated in FIG. 29 and the current "branch" table 17b illustrated in FIG. 30. As illustrated in FIG. 19, on the one hand, the power distribution system screen can obviously ascertain the respective facilities contained in the power distribution system, and on the other hand, it is difficult to ascertain the electrical connection between the respective facilities. For example, in the power distribution system screen illustrated in FIG. 19, the high-voltage wire and the low-voltage wire are overlapped between the switch and the transformer. Therefore, until it can be ascertained that the low-voltage power is supplied in an order of the transformer, the low-voltage wire, the lead-in wire, the load facility "a", it is difficult to confirm the high-voltage wire and the low-voltage wire about whether the electricity flows from the switch to the transformer or from the transformer to the switch. On the other hand, as illustrated in FIG. 20, in a case where the graph structure of the power distribution system is displayed, the flow of electricity from the node on the first layer connected to the substation to the nodes connected to the load facility "a" to the load facility "d" on the seventh layer is hierarchically illustrated. Therefore, it is possible to ascertain at a glance that the high-voltage wire supplies the high-voltage power from the switch in a direction toward the transformer, and the low-voltage wire supplies the low-voltage power from the transformer in a direction toward the switch. Furthermore, even when an abnormality such as a failure or an accident occurs in the facility, it is also easily ascertained that the influence of the blackout from the abnormal facility toward the load facility. In this way, as an aspect of the merit on displaying the power distribution system in the graph structure, the electrical connection between the facilities can be ascertained at a glance.

Further, the controller 19 may employ various integrated circuits or electronic circuits. In addition, some of the functional units of the controller 19 may be configured by other integrated circuits or electronic circuits. For example, as the integrated circuit, an ASIC (Application Specific Integrated Circuit) may be used. In addition, as the electronic circuit, a CPU (Central Processing Unit) or an MPU (Micro Processing Unit) may be used.

[Flow of Processes]

Subsequently, a flow of processes performed by the power distribution management apparatus 10 according to the embodiment will be described. Further, herein, after (1) a power distribution management process performed by the power distribution management apparatus 10 is described, the description will be made in an order of (2) the display control process of the power distribution system screen, (3) a scale changing process, (4) a first display changing process, and (5) a second display changing process.

(1) Power Distribution Management Process

Figure 21:
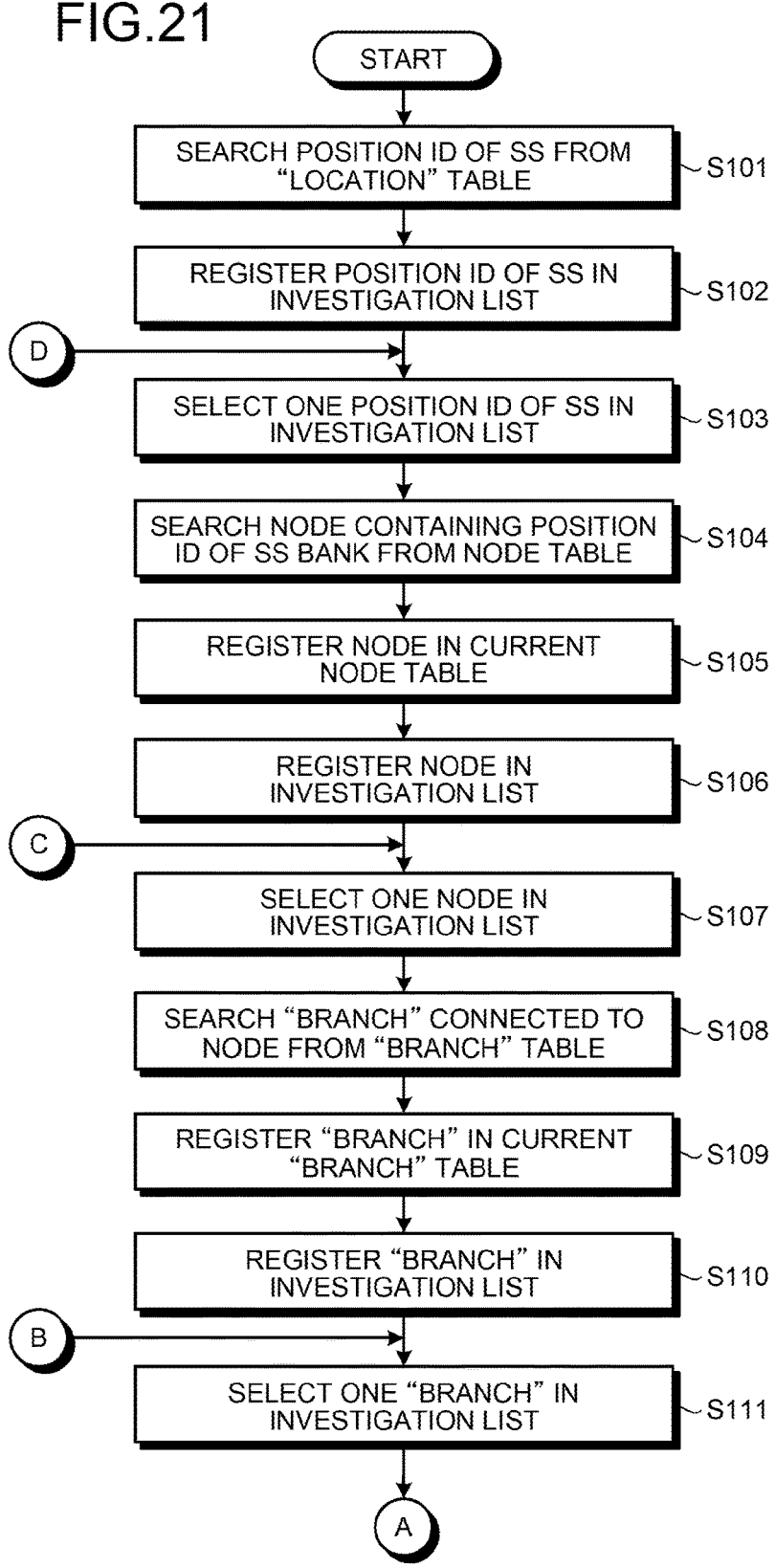
FIG. 21 is a flowchart (1) illustrating a power distribution management process according to the first embodiment.
Figure 22:
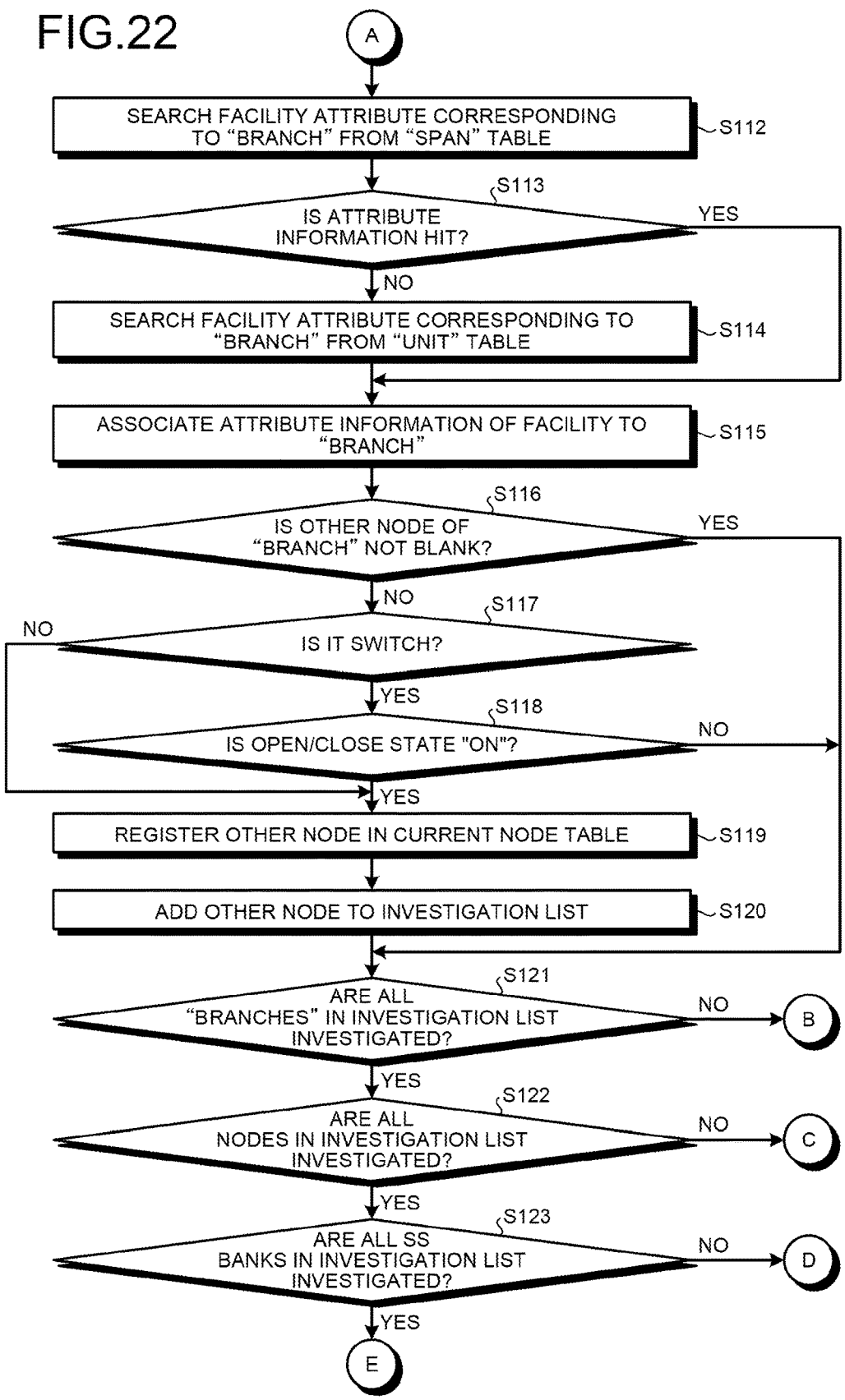
FIG. 22 is a flowchart (2) illustrating the power distribution management process according to the first embodiment.
Figure 23:
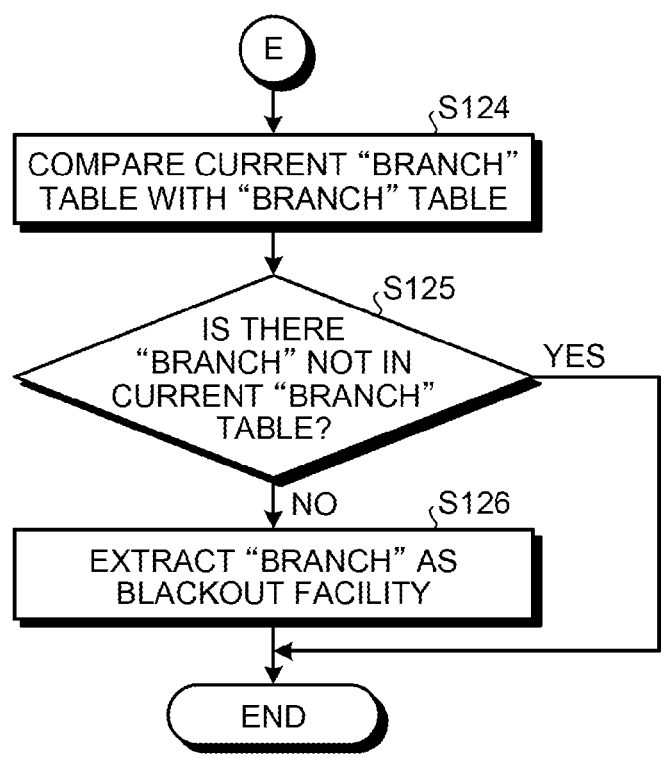
FIG. 23 is a flowchart (3) illustrating the power distribution management process according to the first embodiment.

FIGS. 21 to 23 are flowcharts illustrating a power distribution management process according to the first embodiment. The power distribution management process starts in a case where the browse request for the power distribution system screen is received through the client terminal 30, or in a case where a certain time period elapses after the last process.

As illustrated in FIG. 21, the search unit 19a searches the position ID of which the position type is the power distribution substation "SS" among the position IDs stored in the "location" table 14a (Step S101). Then, the search unit 19a registers the position ID of the power distribution substation SS searched from the "location" table 14a to the investigation list (Step S102).

Subsequently, the search unit 19a selects one position ID of the power distribution substation SS registered in the investigation list (Step S103). Then, the search unit 19a searches a node corresponding to the position ID of the power distribution substation SS to which the selection is previously performed among the nodes stored in the node table 16a (Step S104).

Furthermore, the search unit 19a registers the record of the node searched from the node table 16a in the current node table 17a which is stored as the power distribution system information 17 in the storage unit 13 (Step S105). Furthermore, the search unit 19a registers the node searched from the node table 16a in the investigation list (Step S106).

Then, the search unit 19a selects one node registered in the investigation list (Step S107). Subsequently, the search unit 19a searches the record of the "branch" having a combination of the node IDs containing the node selected in Step S107 (that is, a combination of the node $ID_1$ and the node $ID_2$) among the "branches" stored in the "branch" table 16b (Step S108).

Furthermore, the search unit 19a registers the record of the "branch" searched in Step S108 in the current "branch" table 17b (Step S109). Furthermore, the search unit 19a registers the "branch" searched in Step S108 in the investigation list (Step S110). Subsequently, the search unit 19a selects one "branch" registered in the investigation list (Step S111).

Then, as illustrated in FIG. 22, the search unit 19a searches the attribute information corresponding to the facility ID of the "branch" selected in Step S111 from the "span" table 15b (Step S112). At this time, in a case where the attribute information is not possible to be searched from the "span" table 15b (that is, a case where the attribute information it not hit) (No in Step S113), the search unit 19a performs the following process.

In other words, the search unit 19a searches the attribute information corresponding to the facility ID of the "branch" selected from the "unit" table 15a in Step S111 (Step S114). Further, in a case where the attribute information is possible to be searched from the "span" table 15b (Yes in Step S113), the procedure skips the process of Step S114 and moves to the process of Step S115.

Then, the association unit 19b registers the attribute information of the "branch" in association with the record of the subject "branch" used in the search of the "span" table 15b or the "unit" table 15a among the records stored in the current "branch" table 17b (Step S115).

Thereafter, the search unit 19a determines whether the other node paring with the node investigated in Step S108 among the combinations of the nodes containing the "branch" searched in Step S108 is a blank (Step S116).

At this time, in a case where the other node is not a blank (No in Step S116), the search unit 19a further determines whether the subject "branch" is a switch (Step S117). Then, in a case where the "branch" is a switch (Yes in Step S117), the search unit 19a further determines whether the switch is in the close state (that is, whether the switch is in the ON state) (Step S118).

Herein, in a case where the switch is the ON state (Yes in Step S118), the search unit 19a searches the record of the other node from the node table 16a and then registers the other node in the current node table 17a of the power distribution system information 17 (Step S119). Furthermore, the search unit 19a adds the other node to the investigation list as the uninvestigated node (Step S120).

In addition, even in a case where the "branch" is not a switch (No in Step S117), the search unit 19a searches the record of the other node from the node table 16a and then registers the other node in the current node table 17a of the power distribution system information 17 (Step S119). Furthermore, the search unit 19a adds the other node to the investigation list as the uninvestigated node (Step S120).

On the other hand, in a case where the other node is a blank or in a case where the switch is in the OFF state (Yes in Step S116 or No in Step S118), the procedure proceeds to the process of Step S121.

Thereafter, the search unit 19a determines whether all the "branches" registered in the investigation list are investigated (Step S121). At this time, in a case where some of the "branches" registered in the investigation list are not investigated (No in Step S121), the uninvestigated "branch" is selected (Step S111) and then the processes from Step S112 to Step S121 are repeatedly performed.

Then, when all the "branches" registered in the investigation list are investigated (Yes in Step S121), the search unit 19a determines whether all the nodes registered in the investigation list are investigated (Step S122). At this time, in a case where some of the nodes registered in the investigation list are not investigated (No in Step S122), the uninvestigated node is selected (Step S107) and then processes from Step S108 to Step S121 are repeatedly performed.

Thereafter, when all the nodes registered in the investigation list are investigated (Yes in Step S122), the search unit 19a determines whether all the position IDs of the power distribution substations SS registered in the investigation list are investigated (Step S123). At this time, in a case where some of the position IDs of the power distribution substations SS registered in the investigation list are not investigated (No in Step S123), the position ID of the uninvestigated power distribution substation SS is selected (Step S103) and then the processes from Step S104 to Step S122 are repeatedly performed.

Then, in a case where all the position IDs of the power distribution substations SS registered in the investigation list are investigated (Yes in Step S123), as illustrated in FIG. 23, the search unit 19a compares the record of the "branch" stored in the "branch" table 16b and the record of the "branch" stored in the current "branch" table 17b (Step S124).

Herein, in a case where the "branch" table 16b includes a record of the "branch" not matched with the current "branch" table 17b (No in Step S125), the search unit 19a detects the facility of the facility ID contained in the record of the subject "branch" as a blackout place (Step S126), and the process is ended. On the other hand, in a case where the "branch" table 16b has no record of the "branch" not matched with the current "branch" table 17b (Yes in Step S125), the process is ended without any action.

(2) Display Control Process of Power Distribution System Screen

Figure 24:
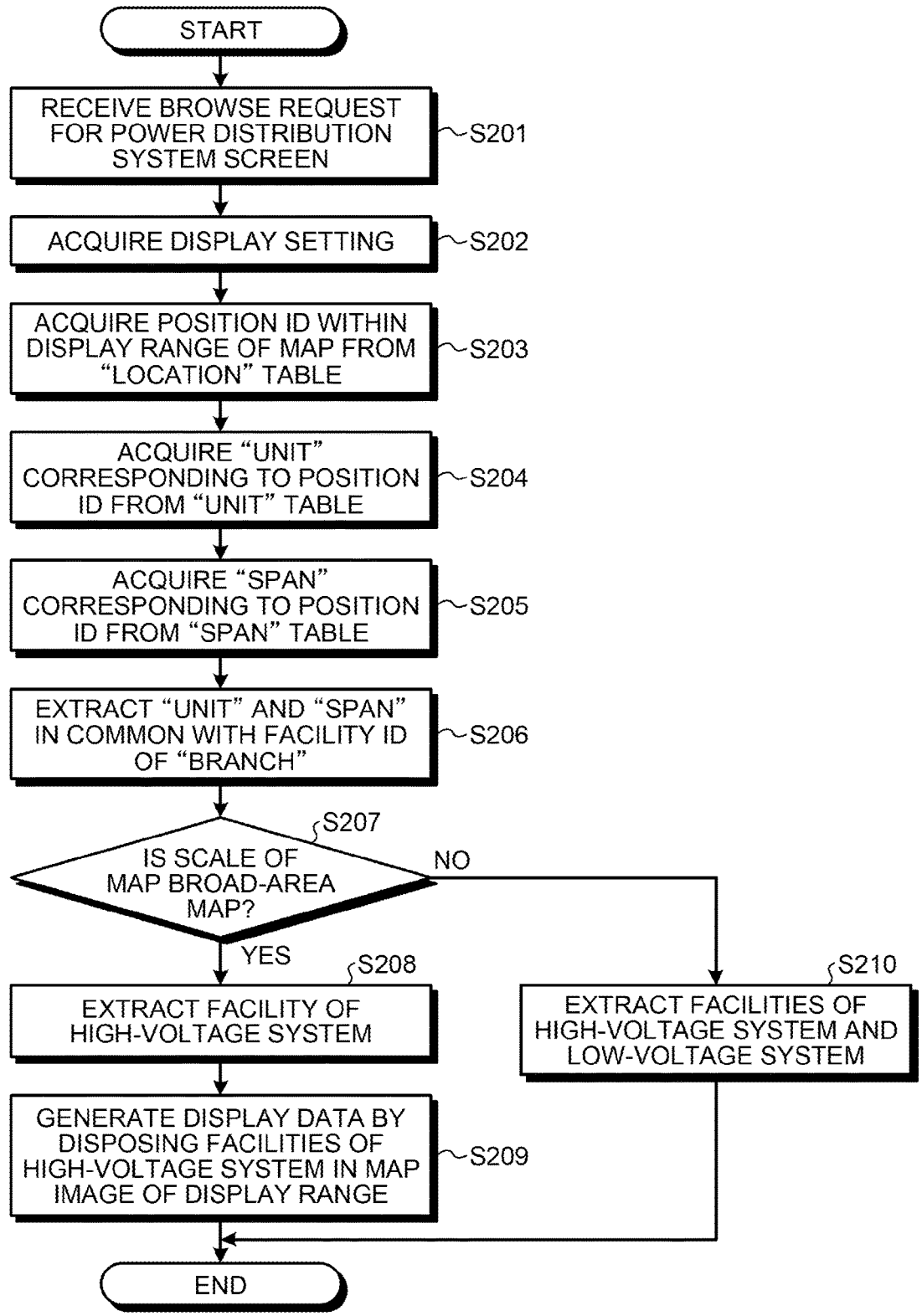
FIG. 24 is a flowchart illustrating a display control process of the power distribution system screen according to the first embodiment.

FIG. 24 is a flowchart illustrating the display control process of the power distribution system screen according to the first embodiment. The display control process is performed in a case where the browse request for the power distribution system screen is received from the client terminal 30 or in a case where a login process from the client terminal 30 to the power distribution management apparatus 10 is successfully performed.

As illustrated in FIG. 24, when the browse request for the power distribution system screen is received from the client terminal 30 (Step S201), the acquisition unit 19c performs the following processes. In other words, the acquisition unit 19c acquires the display setting information 18 stored in the storage unit 13, or acquires the display setting by inputting the display setting through the reception screen from the client terminal 30 (Step S202).

Then, the display controller 19d acquires the position ID contained in the map display range from the "location" table 14a (Step S203). Then, the display controller 19d acquires the record of the "unit" having the position ID within the map display range from the "unit" table 15a (Step S204). Furthermore, the display controller 19d acquires the record of the "span" having the position ID within the map display range from the "span" table 15b (Step S205).

Subsequently, the display controller 19d extracts the record of which the facility ID is registered in the "branch" table 16b among the "units" and the "spans" (Step S206). Therefore, the "unit" and the "span" contained in the current system are extracted among the "units" and the "spans".

Herein, in a case where the map scale is the "broad-area map" (Yes in Step S207), the display controller 19d performs the following process. In other words, the display controller 19d extracts the facility of the high-voltage system with reference to the type contained in the record of the "unit" and the "span" acquired in Step S204 and Step S205 (Step S208).

Subsequently, the display controller 19d generates the display data of the broad-area map by disposing the facility of the high-voltage system in the map image of the display range cut out of the map information using the position information such as the longitude and the latitude corresponding to the position IDs of the "unit" and the "span" (Step S209), and then the process is ended.

On the other hand, in a case where the map scale is the "detailed map" (No in Step S207), the display controller 19d generates the display data of the detailed map by disposing the facilities of the high-voltage system and the low-voltage system in the map image of the display range cut out of the map information using the position information such as the longitude and the latitude corresponding to the position IDs of the "unit" and the "span" acquired in Step S204 and Step S205 (Step S210), and then the process is ended.

(3) Scale Changing Process

Figure 25:
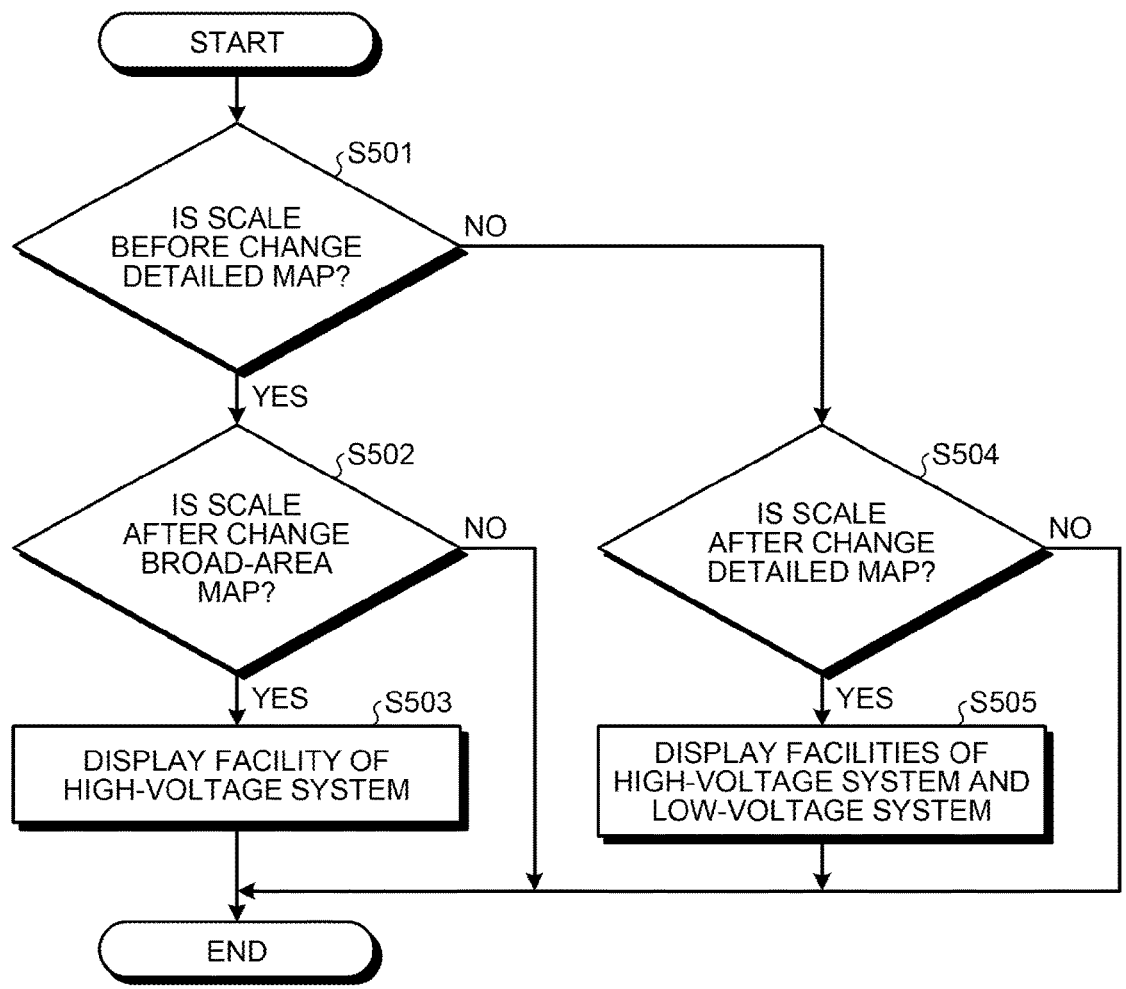
FIG. 25 is a flowchart illustrating a scale changing process according to the first embodiment.

FIG. 25 is a flowchart illustrating a scale changing process according to the first embodiment. The scale changing process, for example, is performed in a case where the change request for the scale such as a pressing down operation of the switching button of the scale is received in a state where the power distribution system screen such as the broad-area map or the detailed map is displayed.

As illustrated in FIG. 25, in a case where the scale change from the detailed map to the broad-area map is requested (Yes in Step S501 and Yes in Step S502), the display controller 19d performs the following process. In other words, the display controller 19d regenerates the display data of the broad-area map by disposing the facilities of the high-voltage system in the map image of the display range (Step S503), and then the process is ended.

On the other hand, in a case where the scale change from the broad-area map to the detailed map is requested (No in Step S501 and Yes in Step S504), the display controller 19d performs the following process. In other words, the display controller 19d regenerates the display data of the detailed map by disposing the facilities of the high-voltage system and the low-voltage system in the map image of the display range (Step S505), and then the process is ended.

Further, in a case where the request for no switching between the detailed map and the broad-area map is made (Yes in Step S501 and No in Step S502, or No in Step S501 and No in Step S504), only the scale of the map and the facilities are changed and the process is ended.

(4) First Display Changing Process

Figure 26:
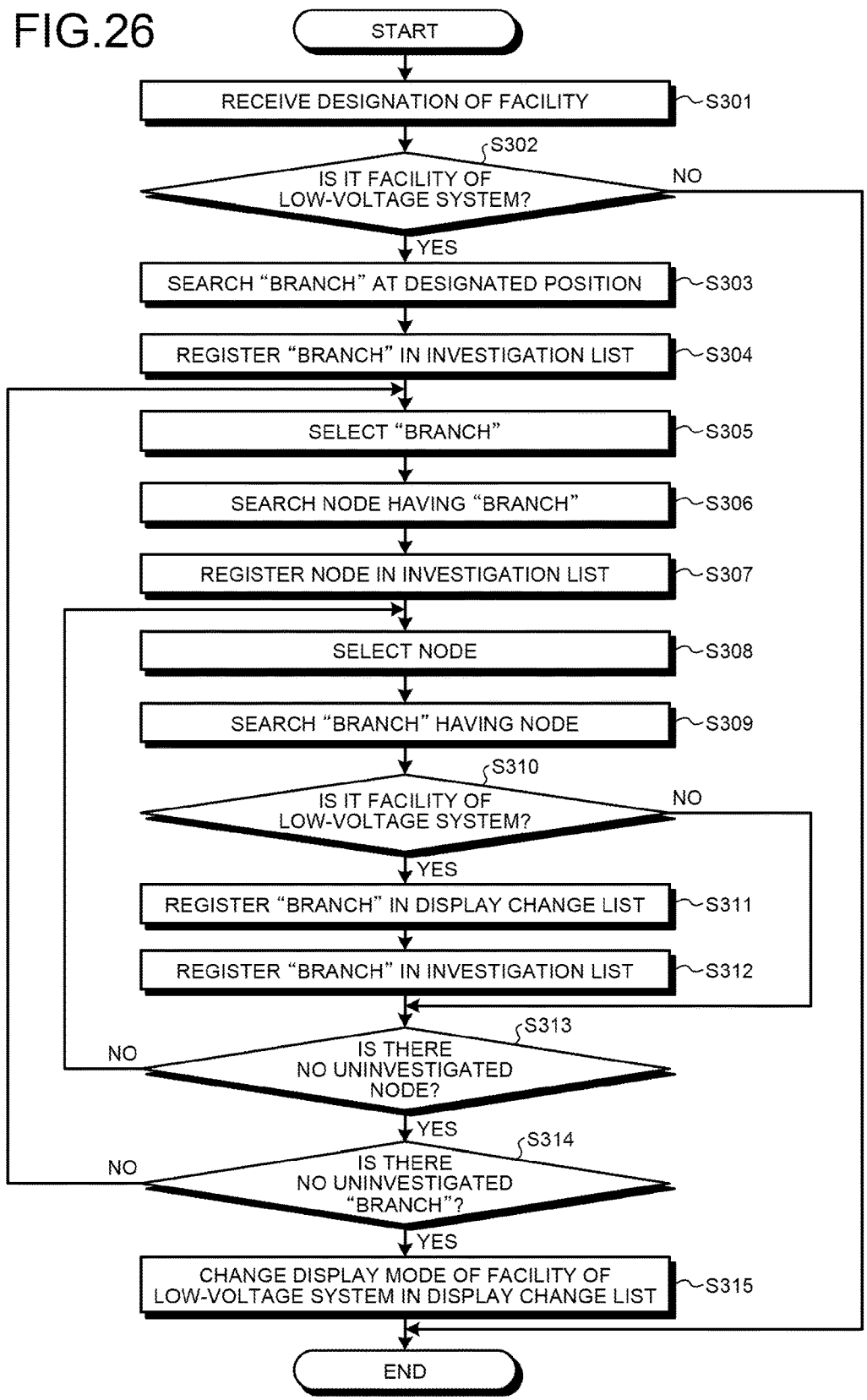
FIG. 26 is a flowchart illustrating a first display changing process according to the first embodiment.

FIG. 26 is a flowchart illustrating a first display changing process according to the first embodiment. The first display changing process, for example, is performed in a case where the facility is designated in a state where the detailed map is displayed.

As illustrated in FIG. 26, when the facility on the screen of the detailed map is designated (Step S301), the display controller 19d determines whether the designated facility is a facility of the low-voltage system (Step S302).

At this time, in a case where the facility of the low-voltage system is designated on the screen of the detailed map (Yes in Step S302), the display controller 19d searches the "branch" at the subject designated position from the "branch" table 16b (Step S303). Then, the display controller 19d registers the "branch" searched from the "branch" table 16b in the investigation list (Step S304).

Subsequently, the display controller 19d selects one "branch" from the investigation list (Step S305). Furthermore, the display controller 19d searches the node having the subject "branch" from the "branch" table 16b (Step S306). Thereafter, the display controller 19d registers the node in the investigation list (Step S307).

Then, the display controller 19d selects one node from the investigation list (Step S308). Subsequently, the display controller 19d searches the "branch" having the node selected in Step S308 from the "branch" table 16b (Step S309).

Herein, the display controller 19d determines whether the "branch" searched from the "branch" table 16b is a facility of the low-voltage system (Step S310). At this time, in a case where the "branch" is a facility of the low-voltage system (Yes in Step S310), the display controller 19d registers the subject "branch" in the display change list (Step S311). Furthermore, the display controller 19d registers the subject "branch" in the investigation list (Step S312).

On the other hand, in a case where the "branch" is a facility of the low-voltage system (No in Step S310), the processes of Step S311 and Step S312 are skipped and the procedure proceeds to the process of Step S313.

Thereafter, the display controller 19d repeatedly performs the processes of Step S308 to Step S312 until the unregistered node disappears from the investigation list (No in Step S313).

Then, when the unregistered node disappears from the investigation list (Yes in Step S313), the display controller 19d repeatedly performs the processes of Step S305 to Step S313 until the uninvestigated "branch" disappears from the investigation list (No in Step S314).

Thereafter, when the uninvestigated "branch" disappears from the investigation list (Yes in Step S314), the display controller 19d generates the display data of the power distribution system screen in which the display mode of the facility of the low-voltage system registered in the display change list is changed to a display mode different from that of the other "branches" (Step S315), and then the process is ended.

(5) Second Display Changing Process

Figure 27:
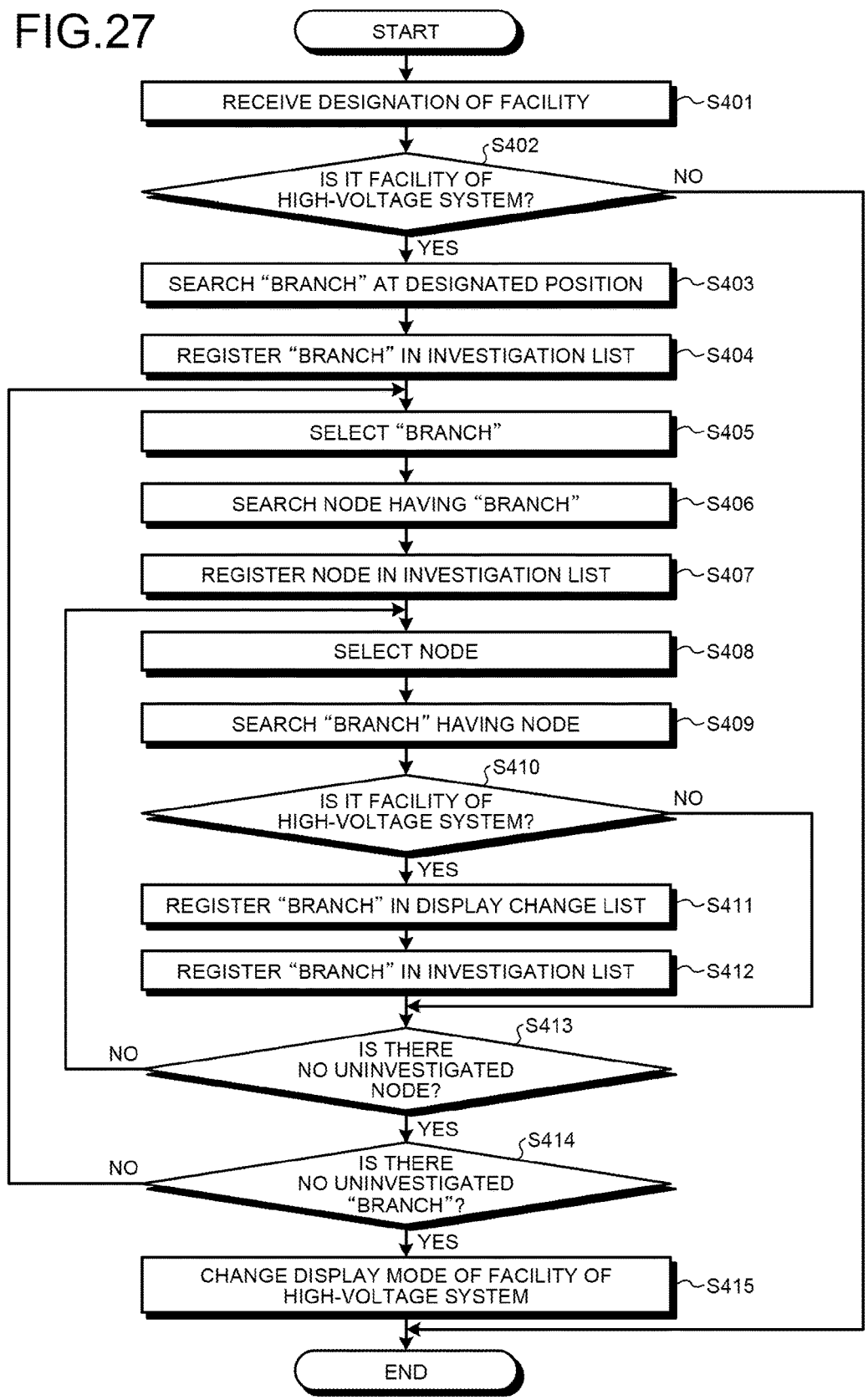
FIG. 27 is a flowchart illustrating a second display changing process according to the first embodiment.

FIG. 27 is a flowchart illustrating a second display changing process according to the first embodiment. The second display changing process, for example, is performed in a case where the facility is designated in a state where the broad-area map is displayed.

As illustrated in FIG. 27, when the facility is designated on the screen of the broad-area map (Step S401), the display controller 19d determines whether the designated facility is a facility of the high-voltage system (Step S402).

At this time, in a case where the facility of the high-voltage system is designated on the screen of the broad-area map (Yes in Step S402), the display controller 19d searches the "branch" at the designated position from the "branch" table 16b (Step S403).

Then, the display controller 19d registers the "branch" searched from the "branch" table 16b in the investigation list (Step S404). Subsequently, the display controller 19d selects one "branch" from the investigation list (Step S405). Furthermore, the display controller 19d searches the node having the subject "branch" from the "branch" table 16b (Step S406). Then, the display controller 19d registers the node in the investigation list (Step S407).

Then, the display controller 19d selects one node from the investigation list (Step S408). Subsequently, the display controller 19d searches the "branch" having the node selected in Step S408 from the "branch" table 16b (Step S409).

Herein, the display controller 19d determines whether the "branch" searched from the "branch" table 16b is a facility of the high-voltage system (Step S410). At this time, in a case where the "branch" is a facility of the high-voltage system (Yes in Step S410), the display controller 19d registers the subject "branch" in the display change list (Step S411). Furthermore, the display controller 19d registers the subject "branch" in the investigation list (Step S412).

On the other hand, in a case where the "branch" is not a facility of the high-voltage system (No in Step S410), the processes of Step S411 to Step S412 are skipped and the procedure proceeds to the process of Step S413.

Thereafter, the display controller 19d repeatedly performs the processes of Step S408 to Step S412 until the unregistered node disappears from the investigation list (No in Step S413).

Then, when the unregistered node disappears from the investigation list (Yes in Step S413), the display controller 19d repeatedly performs the processes of Step S405 to Step S413 until the uninvestigated "branch" disappears from the investigation list (No in Step S414).

Thereafter, when the uninvestigated "branch" disappears from the investigation list (Yes in Step S414), the display controller 19d generates the display data of the power distribution system screen in which the display mode of the facility of the high-voltage system registered in the display change list is changed to a display mode different from that of the other "branches" (Step S415), and then the process is ended.

Effect of First Embodiment

As described above, when performing the displaying of the facility of the power distribution system, the power distribution management apparatus 10 according to the embodiment displays the facilities of the high-voltage system in a case where the display scale is small, and displays the entire facilities of the power distribution system in a case where the display scale is large. Therefore, in a case where the scale is set to be small and the number of facilities to be displayed is increased and thus the symbols and the display sizes of the facilities become small, the facilities to be displayed can be thinning to the facilities of the high-voltage system. In addition, in a case where the scale is set to be large and the number of facilities is decreased and thus the symbols and the display sizes of the facilities become large, the facilities to be displayed can be extended to the entire power distribution system. Therefore, with the power distribution management apparatus 10 according to the embodiment, it is possible to improve the visibility of the facilities which are electrically connected in the power distribution system.

Second Embodiment

Hitherto, the embodiment of the disclosed apparatus has been described, but the invention may be implemented in various different forms other than the embodiment described above. In the following, another embodiment belonging to the invention will be described.

[Distribution and Integration]

In addition, the respective depicted components are not necessarily configured as physically illustrated in the drawings. In other words, a specific pattern of distribution and integration of the respective apparatuses is not limited to the pattern illustrated in the drawing, but some or all of them may be mechanically or physically distributed/integrated in an arbitrary unit according to various loads or usage conditions. For example, the search unit 19a, the association unit 19b, the acquisition unit 19c, or the display controller 19d may be provided as an external apparatus of the power distribution management apparatus 10 to be connected through a network. In addition, the search unit 19a, the association unit 19b, the acquisition unit 19c, or the display controller 19d may be provided in an individual apparatus, and the function of the power distribution management apparatus 10 may be realized by connecting these apparatuses through the network to operate in cooperation with each other.

[Display Control Program]

In addition, the various types of processes described in the above embodiment may be realized by executing a program prepared beforehand using a computer such as a personal computer or a workstation. In the following, using FIG. 28, an example of the computer which executes the display control program having the same functions as the above embodiment will be described.

Figure 28:
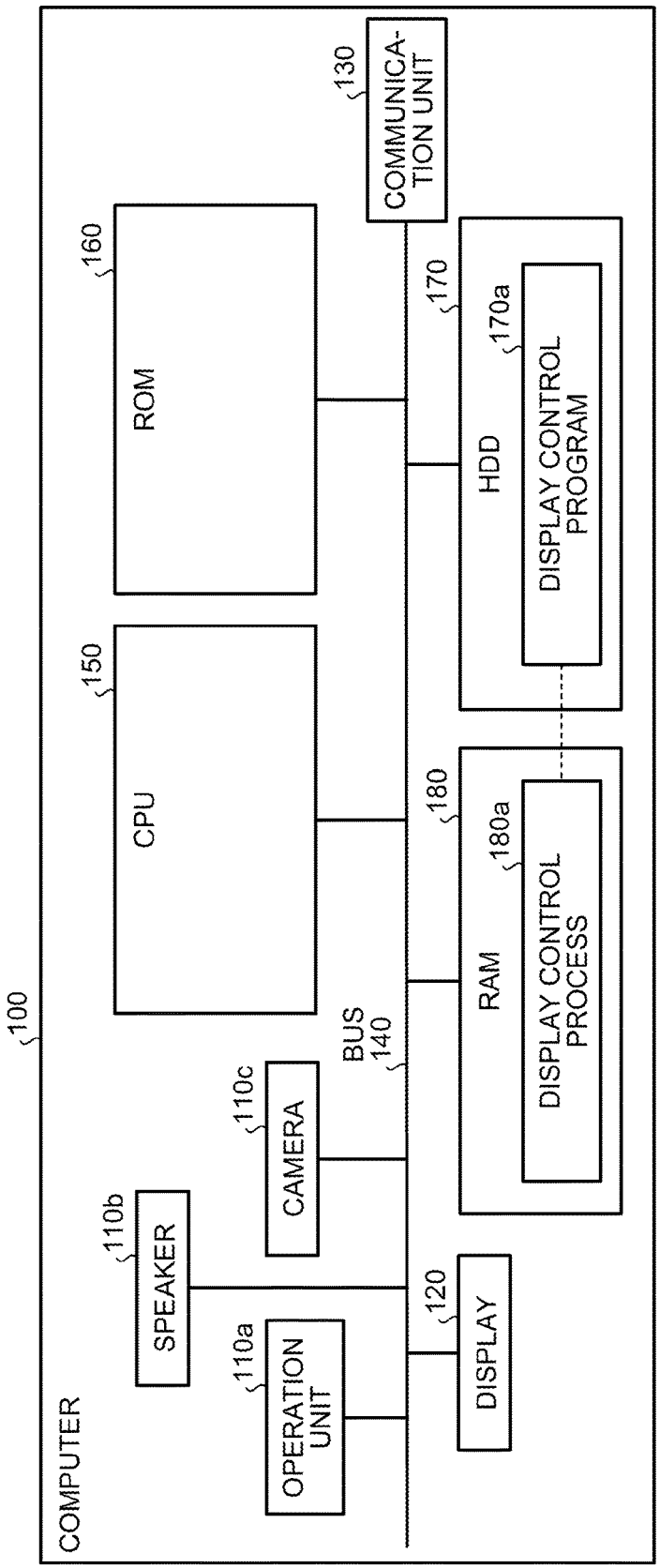
FIG. 28 is a diagram for describing an example of a computer which executes a display control program according to the first embodiment and a second embodiment.

FIG. 28 is a diagram for describing an example of the computer which executes the display control program according to the first embodiment and the second embodiment. As illustrated in FIG. 28, a computer 100 includes an operation unit 110a, a speaker 110b, a camera 110c, a display 120, and a communication unit 130. Furthermore, the computer 100 includes a CPU 150, ROM 160, an HDD 170, and RAM 180. These components 110 to 180 are connected to each other through a bus 140.

As illustrated in FIG. 28, a display control program 170a which performs the same functions as the search unit 19a, the association unit 19b, the acquisition unit 19c, and the display controller 19d illustrated in the first embodiment is stored in the HDD 170 beforehand. The display control program 170a may be appropriately integrated or divided similarly to the respective elements of the search unit 19a, the association unit 19b, the acquisition unit 19c, and the display controller 19d illustrated in FIG. 1. In other words, all the data to be stored in the HDD 170 is not necessarily stored in the HDD 170, and only data for the process may be stored in the HDD 170.

Then, the CPU 150 reads the display control program 170a out of the HDD 170 and develops the program in the RAM 180. Therefore, as illustrated in FIG. 28, the display control program 170a functions as a display control process 180a. The display control process 180a develops various types of data read out of the HDD 170 in an area appropriately allocated for its own sake on the RAM 180, and performs various types of processes based on the various types of developed data. Further, the display control process 180a includes the processes (for example, the processes illustrated in FIGS. 21 to 27) performed by the search unit 19a, the association unit 19b, the acquisition unit 19c, and the display controller 19d illustrated in FIG. 1. In addition, all the respective processing units virtually realized on the CPU 150 are always not necessarily operated on the CPU 150, and only the processing units required for the process may be virtually realized.

Further, the display control program 170a does not always have to be stored in the HDD 170 or the ROM 160 from the beginning. For example, the respective programs may be stored in a "portable physical medium" (what is called an FD, a CD-ROM, a DVD disk, a magneto-optical disk, an IC card, and the like) of a flexible disk inserted in the computer 100. Then, the computer 100 may acquire the respective programs from the portable physical mediums and execute the programs. In addition, the respective programs are stored in another computer or a server apparatus connected to the computer 100 through a public line, the Internet, a LAN, a WAN, and the like, and the computer 100 may acquire and execute these programs.

According to an embodiment, it is possible to ascertain electrical connection of a power distribution system in a unit of facility.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power distribution management apparatus comprising:
   an electrical connection storage unit configured to store electrical connection information in which a combination of a plurality of junctions at which a plurality of facilities of a power distribution system are electrically connected to each other and a facility determined based on the combination are associated, the facility being assigned to the combination and being one of the plurality of facilities;
   a search unit configured to search the facility corresponding to the combination while finding a junction that is not determined among the plurality of junctions contained in the combination starting from a predetermined junction by using the electrical connection information as input;
   an acquisition unit configured to acquire a display scale for displaying the power distribution system; and
   a display controller configured to display the facility having a junction near a substation from the predetermined facility among the facilities obtained as a result of the searching when the scale is equal to or less than a predetermined scale, and display the facility obtained as a result of the searching when the scale is larger than the predetermined scale, wherein
   the power distribution management apparatus includes:
   a position storage unit configured to store position information in which a facility of the power distribution system and a position of the facility are associated, wherein
   the display controller displays the facility having the junction near the substation or the facility obtained as a result of the searching with reference to the position information, wherein
   the acquisition unit is configured to acquire a setting for displaying the power distribution system, the setting including a map display range and a map scale, and
   the search unit is configured to search, among a plurality of facilities stored in a storage unit, for a plurality of facilities whose pieces of position information indicate positions within the map display range.

2. The power distribution management apparatus according to claim 1, wherein
   when any facility is designated upon displaying a facility having the junction near the substation, the display controller changes a display mode of a facility of a power distribution system to which the facility belongs into a display mode different from a display mode of a facility of another power distribution system.

3. The power distribution management apparatus according to claim 1, wherein
   when a facility having a junction near a customer from the predetermined facility is designated upon displaying the facility obtained as a result of the searching, the display controller changes a display mode of the facility having the junction near the customer to a display mode different from a display mode of another facility.

4. A display control method comprising:
   by using electrical connection information in which a combination of a plurality of junctions at which a plurality of facilities of a power distribution system are electrically connected to each other and a facility determined based on the combination are associated as input, the facility being assigned to the combination and being one of the plurality of facilities, searching the facility corresponding to the combination while finding a junction that is not determined among the plurality of junctions contained in the combination starting from a predetermined junction, using a processor;
   acquiring, using the processor, a display scale for displaying the power distribution system;
   first displaying, using the processor, the facility having a junction near a substation from the predetermined facility among the facilities obtained as a result of the searching when the scale is equal to or less than a predetermined scale; and
   second displaying, using the processor, the facility obtained as a result of the searching when the scale is larger than the predetermined scale, wherein
   the first displaying includes displaying the facility having the junction near the substation with reference to position information in which a facility of the power distribution system and a position of the facility are associated, and
   the second displaying includes displaying the facility obtained as a result of the searching with reference to the position information, wherein
   the acquiring includes acquiring a setting for displaying the power distribution system, the setting including a map display range and a map scale, and
   the searching includes searching, among a plurality of facilities stored in a storage unit, for a plurality of facilities whose pieces of position information indicate positions within the map display range.

5. The display control method according to claim 4, wherein
   when any facility is designated upon displaying a facility having the junction near the substation, the first displaying includes changing a display mode of a facility of a power distribution system to which the facility belongs into a display mode different from a display mode of a facility of another power distribution system.

6. The display control method according to claim 4, wherein
   when a facility having a junction near a customer from the predetermined facility is designated upon displaying the facility obtained as a result of the searching, the second displaying includes changing a display mode of the facility having the junction near the customer to a display mode different from a display mode of another facility.

7. A non-transitory computer readable recording medium having stored therein a display control program that causes a computer to execute a process comprising:
   by using electrical connection information in which a combination of a plurality of junctions at which a plurality of facilities of a power distribution system are electrically connected to each other and a facility determined based on the combination are associated as input, the facility being assigned to the combination and being one of the plurality of facilities, searching the facility corresponding to the combination while finding a junction that is not determined among the plurality of junctions contained in the combination starting from a predetermined junction, acquiring a display scale for displaying the power distribution system, first displaying the facility having a junction near a substation from the predetermined facility among the facilities obtained as a result of the searching when the scale is equal to or less than a predetermined scale; and second displaying the facility obtained as a result of the searching when the scale is larger than the predetermined scale, wherein the first displaying includes displaying the facility having the junction near the substation with reference to position information in which a facility of the power distribution system and a position of the facility are associated, and the second displaying includes displaying the facility obtained as a result of the searching with reference to the position information, wherein the acquiring includes acquiring a setting for displaying the power distribution system, the setting including a map display range and a map scale, and the searching includes searching, among a plurality of facilities stored in a storage unit, for a plurality of facilities whose pieces of position information indicate positions within the map display range.

8. The non-transitory computer readable recording medium according to claim 7, wherein when any facility is designated upon displaying a facility having the junction near the substation, the first displaying includes changing a display mode of a facility of a power distribution system to which the facility belongs into a display mode different from a display mode of a facility of another power distribution system.

9. The non-transitory computer readable recording medium according to claim 7, wherein when a facility having a junction near a customer from the predetermined facility is designated upon displaying the facility obtained as a result of the searching, the second displaying includes changing a display mode of the facility having the junction near the customer to a display mode different from a display mode of another facility.

\* \* \* \* \*